US00RE36376E

United States Patent [19]

Cage et al.

[11] E Patent Number: Re. 36,376

[45] Reissued Date of Patent: Nov. 9, 1999

[54] STABILITY CORIOLIS MASS FLOW METER

[75] Inventors: Donald R. Cage, Longmont; James R. Ruesch; Timothy J. Cunningham, both of Boulder, all of Colo.

[73] Assignee: Micro Motion, Inc., Boulder, Colo.

[21] Appl. No.: 09/110,015

[22] PCT Filed: Jun. 8, 1990

[86] PCT No.: PCT/US90/03284

§ 371 Date: Jan. 16, 1992

§ 102(e) Date: Jan. 16, 1992

[87] PCT Pub. No.: WO90/15310

PCT Pub. Date: Dec. 12, 1990

Related U.S. Patent Documents

Reissue of:

[64] Patent No.: 5,301,557
Issued: Apr. 12, 1994
Appl. No.: 07/820,648
Filed: Jun. 8, 1990

U.S. Applications:

[

[63] Continuation-in-part of application No. 07/364,032, Jun. 9, 1989, abandoned.

[51] Int. Cl.[6] ..... G01F 1/84

[52] U.S. Cl. ..... 73/861.355

[58] Field of Search ..... 73/861.355, 861.356

[56] References Cited

U.S. PATENT DOCUMENTS

| | | | |
|---|---|---|---|
| 4,422,338 | 12/1983 | Smith . | |
| 4,491,025 | 1/1985 | Smith et al. . | |
| 4,768,385 | 9/1988 | Cage . | |
| 4,823,613 | 4/1989 | Cage et al. | 73/861.38 |

FOREIGN PATENT DOCUMENTS

| | | |
|---|---|---|
| 0 212 782 | 3/1987 | European Pat. Off. . |
| 0 250 706 | 1/1988 | European Pat. Off. . |
| 1337668A1 | 9/1987 | U.S.S.R. . |
| 8706691 | 11/1987 | WIPO . |

OTHER PUBLICATIONS

P.P. Kremlevsky, *Flowmeters and Quantity Meters,* 1989, pp. 348–351.

*Primary Examiner*—Max H. Noori
*Assistant Examiner*—Harshad Patel
*Attorney, Agent, or Firm*—Thomas S. Hahn

[57] ABSTRACT

An optimized Coriolis mass flow meter is disclosed which has improved stability to excitations caused by external influences. A primary source of improvement involves determining by modal analysis of the flow conduit a location for the sensor means that minimizes the influence of external excitation of one or more of the first in phase bending mode, the first out of phase bending mode, the first out of phase twist mode, the second out of phase twist mode, the second out of phase bending mode and the third out of phase bending mode.

10 Claims, 29 Drawing Sheets

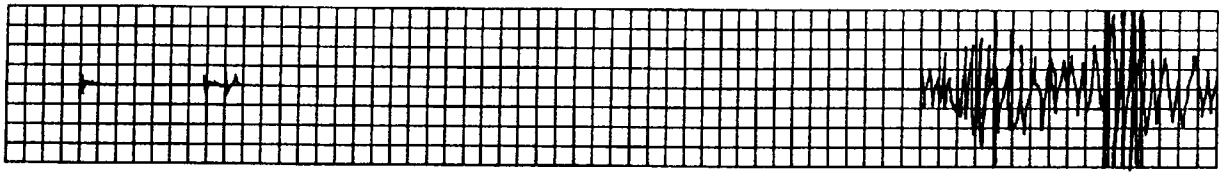
FIG. 5A
Amended
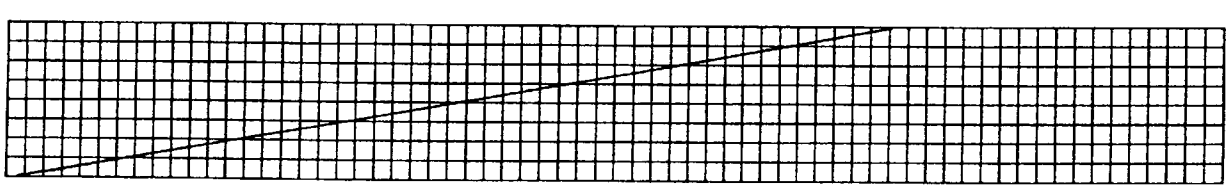
FIG. 5C
Amended

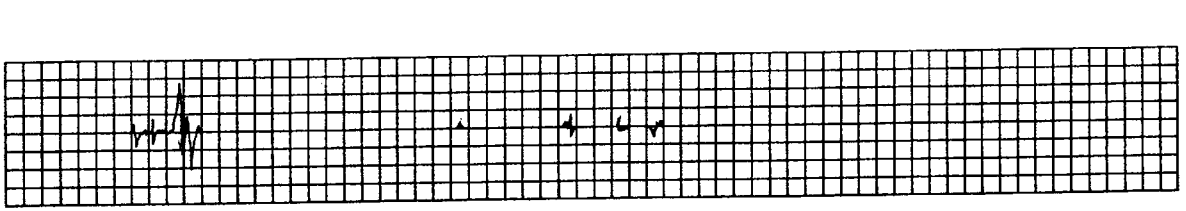
FIG. 5D
Amended
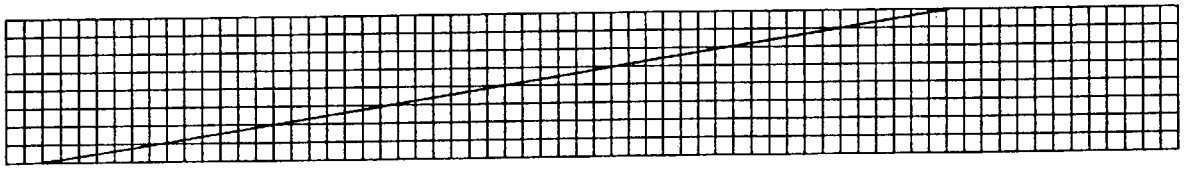
FIG. 5F
Amended

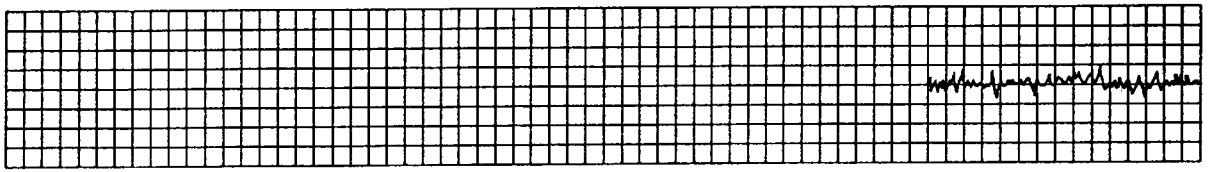
FIG. 6B
Amended
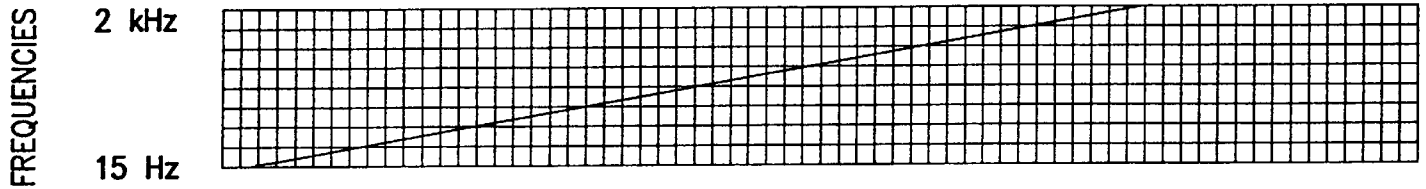
FIG. 6C
Amended

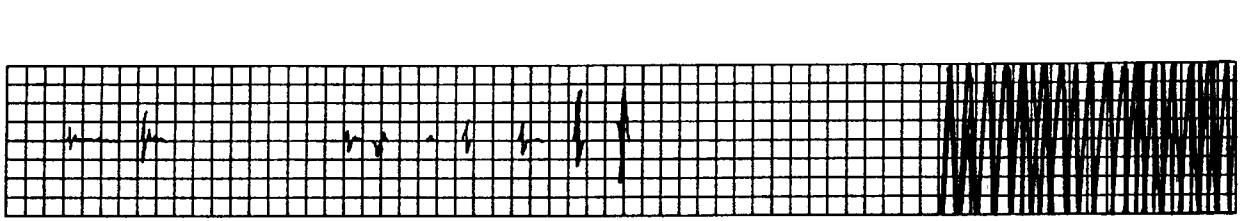
FIG. 6D
Amended
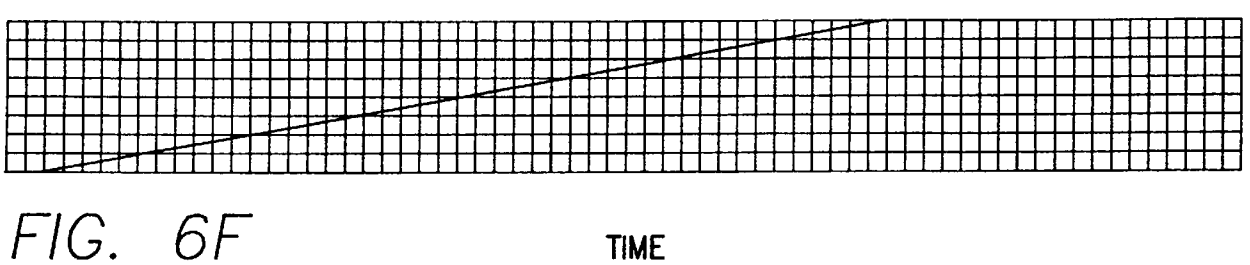
FIG. 6F
Amended

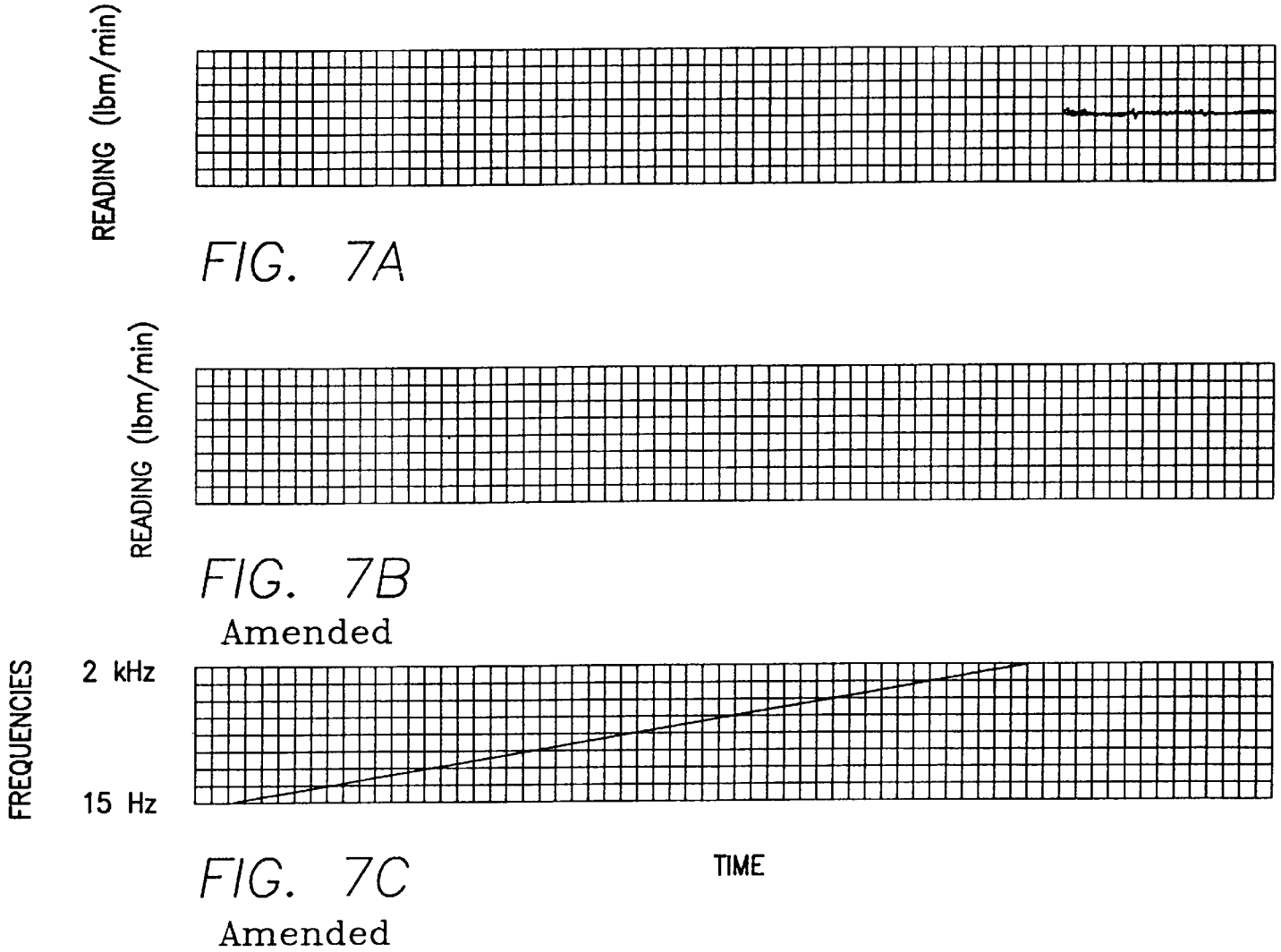
FIG. 7A
FIG. 7B
Amended
FIG. 7C
Amended

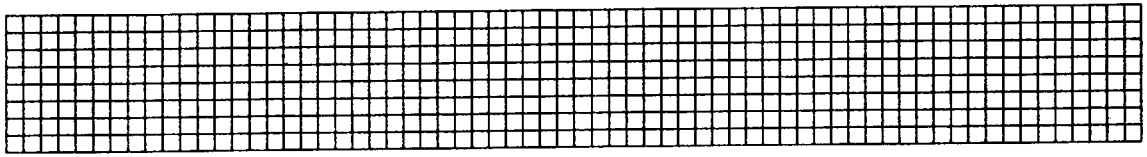
FIG. 7E
Amended
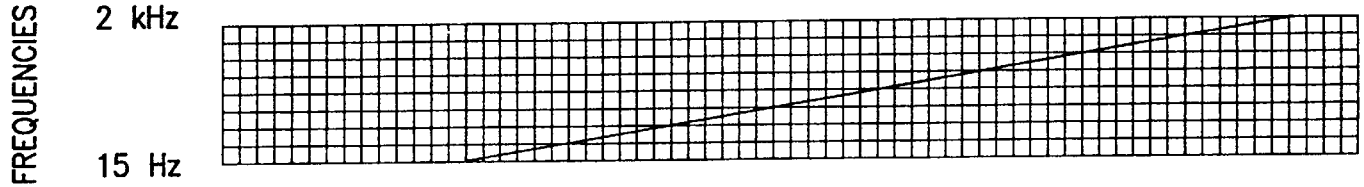
FIG. 7F
Amended

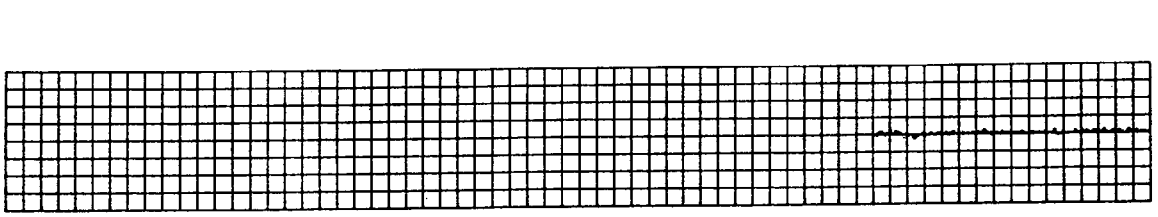
FIG. 7G
Amended
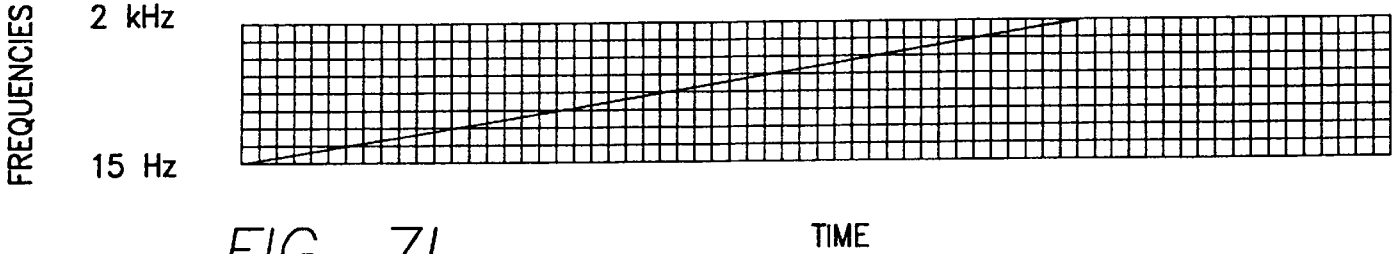
FIG. 7I
Amended

STABILITY CORIOLIS MASS FLOW METER

Matter enclosed in heavy brackets [ ] appears in the original patent but forms no part of this reissue specification; matter printed in italics indicates the additions made by reissue.

BACKGROUND OF THE INVENTION

This application is a continuation-in-part of our U.S. patent application Ser. No. 364,032 filed Jun. 9, 1989 now abandoned.

In the art of measuring mass flow rates of flowing substances it is known that flowing a fluid through an oscillating flow conduit induces Coriolis forces which tend to twist the conduit in a direction essentially transverse to the direction of fluid flow and also to the axis about which oscillation occurs. It is also known that the magnitude of such Coriolis forces is related to both the mass flow rate of the fluid passing through the conduit and the angular velocity at which the conduit is oscillated.

One of the major technical problems historically associated with efforts to design and make Coriolis mass flow rate instruments was the necessity either to measure accurately or control precisely the angular velocity of an oscillated flow conduit so that the mass flow rate of the fluid flowing through the flow conduits could be calculated using measurements of effects caused by Coriolis forces. Even if the angular velocity of a flow conduit could be accurately determined or controlled, precise measurement of the magnitude of effects caused by Coriolis forces raised another severe technical problem. This problem arose in part because the magnitude of generated Coriolis forces is very small in comparison to other forces such as inertia and damping, therefore resulting Coriolis force-induced effects are minute. Further, because of the small magnitude of the Coriolis forces, effects resulting from external sources such as vibrations induced, for example, by neighboring machinery or pressure surges in fluid lines, may cause erroneous determinations of mass flow rates. Such error sources as discontinuities in the flow tubes, unstable mounting of the tubes use of tubes lacking mechanically reproducible bending behavior, etc., often completely masked the effects caused by generated Coriolis forces, greatly diminishing the practical use of a mass flow meter.

A mechanical structure and measurement technique which, among other advantages: (a) avoided the need to measure or control the magnitude of the angular velocity of a Coriolis mass flow rate instrument's oscillating flow conduit; (b) concurrently provided requisite sensitivity and accuracy for the measurement of effects caused by Coriolis forces; and (c) minimized susceptibility to many of the errors experienced in earlier experimental mass flow meters, is taught in U.S. Pat. Nos. Re 31,450, entitled "Method and Structure for Flow Measurement" and issued Nov. 29, 1983; 4,422,338 entitled "Method and Apparatus for Mass Flow Measurement" and issued Dec. 27, 1983; and 4,491,025 entitled "Parallel Path Coriolis Mass Flow Rate Meter" and issued Jan. 1, 1985. The mechanical arrangements disclosed in these patents incorporate curved continuous flow conduits that are free of pressure sensitive joints or sections, such as bellows, rubber connectors or other pressure deformable portions. These flow conduits are solidly mounted at their inlet and outlet ends, with their curved portions cantilevered from the support. For example, in flow meters made according-to any of the aforementioned patents, the flow conduits are welded or brazed to the support, so that they are oscillated in spring-like fashion about axes which are located essentially contiguous with the solid mounting points of the-flow conduits or, as disclosed in U.S. Pat. No. 4,491,025, essentially at the locations of solidly attached brace bar devices designed to clamp two or more conduits rigidly at points located forward of the mounting points.

By so fashioning the flow conduits, a mechanical situation arises whereby, under flow conditions, the forces opposing generated Coriolis forces in the oscillating flow conduits are essentially linear spring forces. The Coriolis forces, opposed by essentially liner spring forces, deflect or twist the oscillating flow conduits containing flowing fluid about axes located between and essentially equidistant from the portions of those flow conduits in which the Coriolis forces manifest themselves. T-he magnitude of the deflections is a function of the magnitude of the generated Coriolis forces and the linear spring forces opposing the generated Coriolis forces. Additionally these solidly mounted, continuous flow conduits are designed so that they have resonant frequencies about the oscillation axes (located essentially at the locations of the mountings or brace bars) that are different from, and preferably lower than, the resonant frequencies about the axes relative to which Coriolis forces act.

Various specific shapes of solidly mounted curved flow conduits are disclosed in the prior art. Included among these are generally U-shaped conduits "which have legs which converge, diverge or are skewed substantially" (Re 31,450, col. 5, lines 10–11). Also disclosed in the art are straight, solidly mounted flow conduits which work on the same general principles as the curved conduits.

As stated above, the Coriolis forces are generated when fluid is flowed through the flow conduits while they are driven to oscillate. Accordingly, under flow conditions, one portion of each flow conduit on which the Coriolis forces act will be deflected (i.e. will twist) so as to move ahead, in the direction in which the flow conduit is moving, of the other portion of the flow conduit on which Coriolis forces are acting. The time or phase relationship between when the first portion of the oscillating flow conduit deflected by Coriolis forces has passed a preselected point in the oscillation pathway of the flow conduit to the instant when the second portion of that conduit passes a corresponding preselected point in that pathway is a function of the mass flow rate of the fluid passing through the flow conduit. This time difference measurement may be made by various kinds of sensors, including optical sensors as specifically exemplified in U.S. Pat. No. Re. 31,450, electromagnetic velocity sensors as specifically exemplified in U.S. Pat. Nos. 4,422,338 and 4,491,025, or position or acceleration sensors are also disclosed in U.S. Pat. No. 4,422,338. A parallel path double flow conduit embodiment with sensors for making the preferred time difference measurements is described in U.S. Pat. No. 4,491,025. This embodiment provides a Coriolis mass flow rate meter structure which is operated in the turning fork-like manner earlier described in U.S. Pat. No. Re. 31,450. Detailed discussion of methods and means for combining motion sensor signals to determine mass flow rate appears in U.S. Pat. Nos. Re. 31, 450 and 4,442,338 and in application PCT/US88/02360, published as WO89/00679.

In the aforementioned meter designs, the sensors are-typically placed at symmetrically located positions along the inlet and outlet portions of the flow conduit which provide acceptable sensitivity to enable the selected sensors to make measurements yielding a mass flow rate that is accurate within +/− 0.2 percent.

On the order of about 100,000 Coriolis mass flow meters have been built using the invention of one or more of U.S.

Pat. Nos. Re 31,450, 4,422,338 and 4,491,025 and these meters have been extensive commercial use. More than ten years' experience in the commercial application of these meters to mass flow rate measurement with a variety of diverse fluid products has shown that in general, the end users are satisfied with the sensitivity and accuracy of their performance but desire that the meters be improved in overall stability, including zero stability, thus reducing plant maintenance related to these meters, including meter recalibration. Meter instability, in general, results from susceptibility of the meters to the unwanted transfer of mechanical energy from sources external to such meters. Such forces can also affect the zero (i.e., measured value at no flow) stability of the flow meters.

While commercial experience as described above has shown essentially no problem in practical use with fatigue failure of the flow conduits, it is recognized that potential improvements in conduit life span by reducing possible sources of fatigue failure represent a forward step. Similarly, providing a sealed pressure-tight case increases the suitability of the meters for hazardous materials applications at significant pressures which may range up to 1,000 psi and even higher. Even when achievable pressure rating is balanced against cost considerations involved in fabricating the case, the use of a case as herein described affords a pressure rating for the meter at least as high as 300 psi for flow tube outside diameter sizes up to about 2½ inches and as high as 150 psi for larger sized flow tubes.

SUMMARY OF THE INVENTION

The present invention provides an improved mass flow meter with considerably increased overall stability, including reduced susceptibility to external forces and increased zero stability, reduced pressure drop characteristics and better resistance to fluid pressures. A number of design changes to the Coriolis mass flow meters manufactured in accordance with one or more of the previously cited patents have resulted in optimizing their already successful features and operating characteristics.

The present invention relates to Coriolis mass flow rate meters that include one or more flow conduits which are driven to oscillate at the resonant frequency of the flow conduit containing fluid flowing therethrough. The drive frequency is maintained at this resonance by a feedback system, heretofore described, which detects a change in the resonant behavior of the fluid-filled conduit as a result of the fluid mass change due to changes in fluid density. The flow conduits of these Coriolis mass flow rate meters are mounted to oscillate about an oscillation axis located substantially at the mounting points or at the location of the brace bars. The resonant frequency of oscillation is that associated with the oscillation axis. The flow conduit also deforms (twists) about a second axis which is that axis about which the flow conduit deflects or twists in response to Coriolis forces generated as a result of the flow of fluid through the oscillating flow conduit. This latter axis associated with Coriolis-caused deflections is substantially transverse to the oscillation axis. The present invention provides in improved flow meter with enhanced stability having reduced susceptibility to the influence of outside forces, primarily because of optimized sensor placement as explained more fully hereinafter. Other improvements which contribute to overall stability of the improved meter include reducing by at least fourfold the mass of the sensors and driver.

In a preferred embodiment, a modified U-shaped flow conduit design is provided, having two essentially straight inlet and outlet legs which converge towards each other at the process line manifold, and bends, at two symmetrical locations along the length of the conduit, separated by an essentially straight middle portion. It is also contemplated that some modified U-shape flow conduits will have convergent inlet and outlet legs which are separated by a continuously curved middle portion, rather than a straight middle portion and that others will have substantially parallel inlet and outlet legs in accordance with current commercial embodiments. Attached to each flow conduit at symmetrical locations are two motion sensors, so located that the susceptibility to external forces of the signals which they detect and transmit to the meter electronics is dramatically reduced over that of previously known commercial mass flow meters. This is accomplished in one preferred embodiment by locating the motion sensors between but as close as possible to the nodes on each side of the conduit of the second out of phase twist mode and the third out of phase bending mode of the flow tube and placing the driver equidistant between these sensors. The masses-of the motion sensors plus their mountings and of the driver plug its mounting are substantially reduced in relation to the corresponding parts of the mass flow meters heretofore in commercial use. The susceptibility of the flow conduit to fatigue failure may optionally be reduced by providing novel brace bars having a novel nipple shaped sleeve, which serve to define the axis about which each flow conduit oscillates, but conventional brace bars may alternatively be used and in some embodiments, brace bars are omitted. In one embodiment, advantage may be taken of the convergent U-shape to provide a wafer configuration manifold structure, without flanges, for connecting to the process line to be monitored. A special sealed pressure tight case is provided which encloses the flow conduit, motion sensors, driver and associated electrical connectors. Several embodiments of such a case are disclosed herein, among which the embodiment of FIGS. 8 and 9 is preferred.

BRIEF DESCRIPTION OF THE DRAWINGS

FIGS. 10–10F and 11A–11L illustrate further test results as hereinafter described.

DETAILED DESCRIPTION OF THE INVENTION INCLUDING THE DRAWINGS

The major feature of the present invention the minimization of the influence of external forces upon meter stability—is achieved through optional placement of sensors and, to a limited extent, of brace bars. It has been found that there are essentially six modes of vibration, within the frequency range of 0 to 2000 Hz, excitation of which is likely to result in loss of meter stability. They are identified as (1) the first in phase bending mode (of lower frequency than the drive frequency), (2) the first out of phase bending mode, which corresponds to the fundamental drive frequency, except that the drive frequency is the natural frequency of the fluid—filled tube (whereas modal analysis is conducted on the empty tube), (3) the first out of phase twist (also called torsion or deflection) mode, (4) the second out of phase twist mode, (5) the second out of phase bending mode and (6) the third out of phase bending mode. Optimal placement of sensors is achieved by conducting a modal analysis of the flow tube to locate the two nodes for each of the six modes on that tube and to determine, based upon tube geometry, size and material, those node points to which the sensors should be placed most closely proximate. For a flow tube of the geometric configuration shown in FIG. 1, for example, modal analysis has shown the sensors should optimally be placed intermediate the second out of phase twist node and the third out of phase bending node on either side of the flow tube, as close to each of these nodes as possible. Those skilled in the art will appreciate that, depending upon the geometry and other characteristics of the flow tube, node points for the six enumerated modes may be located differently in relation to one another. In some flow tube shapes two or more node points of different modes may actually coincide, making it possible to locate sensors at the location of coincidence and thereby enhancing flow tube sensitivity. The present invention embraces the discovery, as a rule of thumb, that meter stability is enhanced by locating the sensors as close as possible on each side of the tube to at least two node points, each of which is a node point for a different one of the modes above, and especially of those designated (3) and (6) above. The invention further embraces the discovery that the influence of mode 1, the first in phase bending mode, may be minimized or eliminated by a placement of the brace bars which separates harmonics of mode 1 from those of mode 2.

Figure 1:
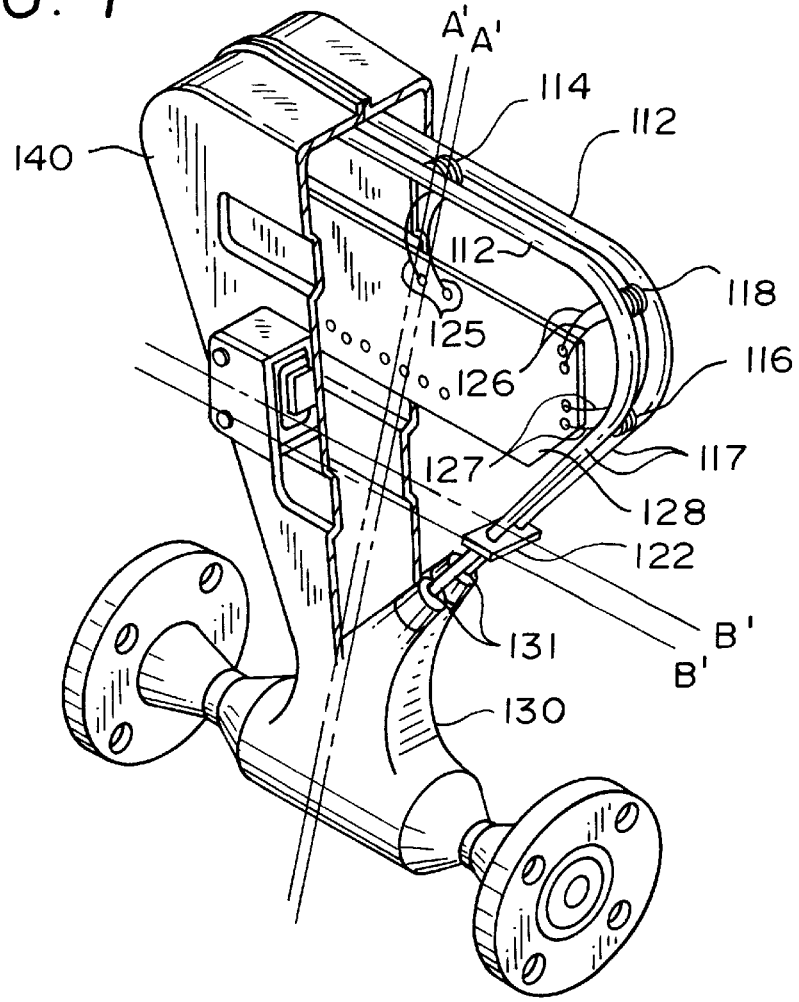
FIG. 1 illustrates an optimized Coriolis mass flow meter of this invention partially within a case
Figure 4:
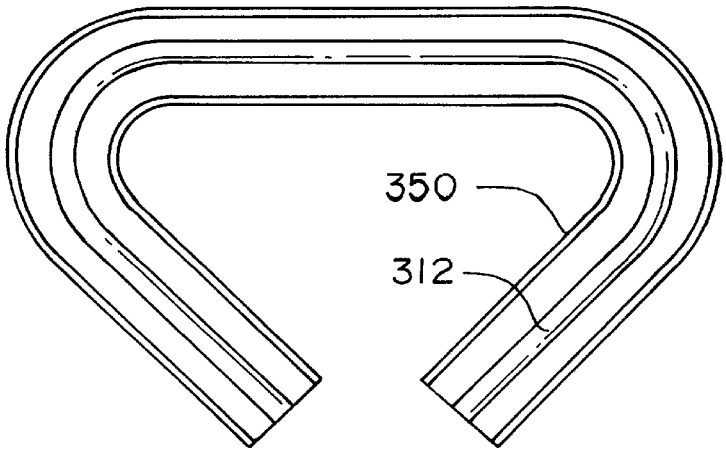
FIG. 4 illustrates an optional high pressure case design.
Figure 5B:
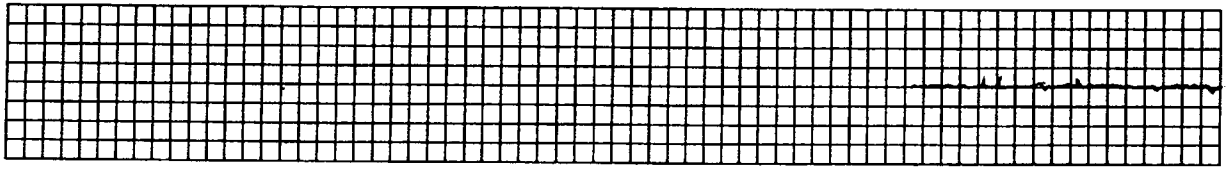
FIGS. 5A–7I illustrate shaker table stability test results.
Figure 5E:
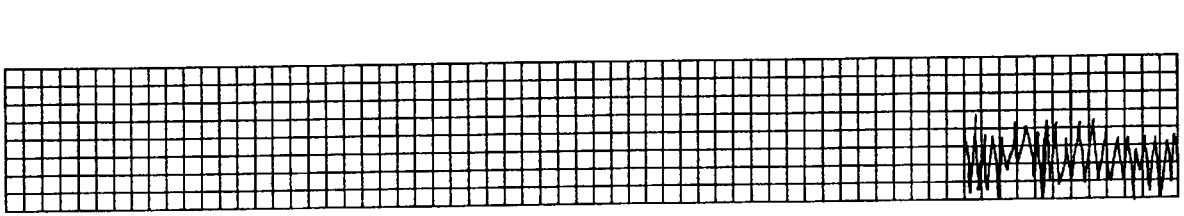
Figure 6A:
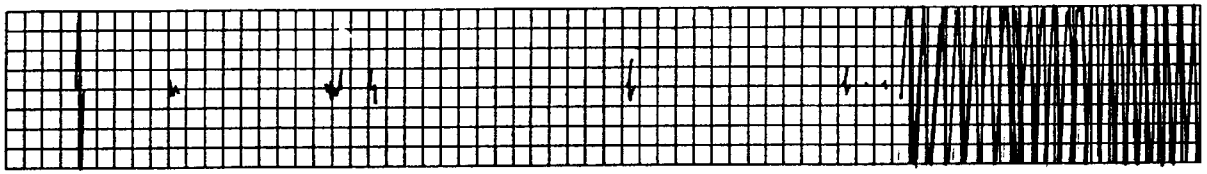
Figure 6E:
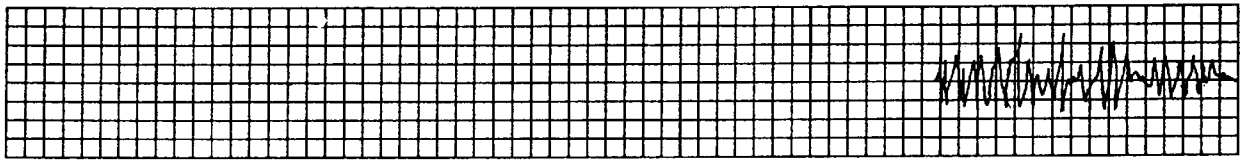
Figure 8:
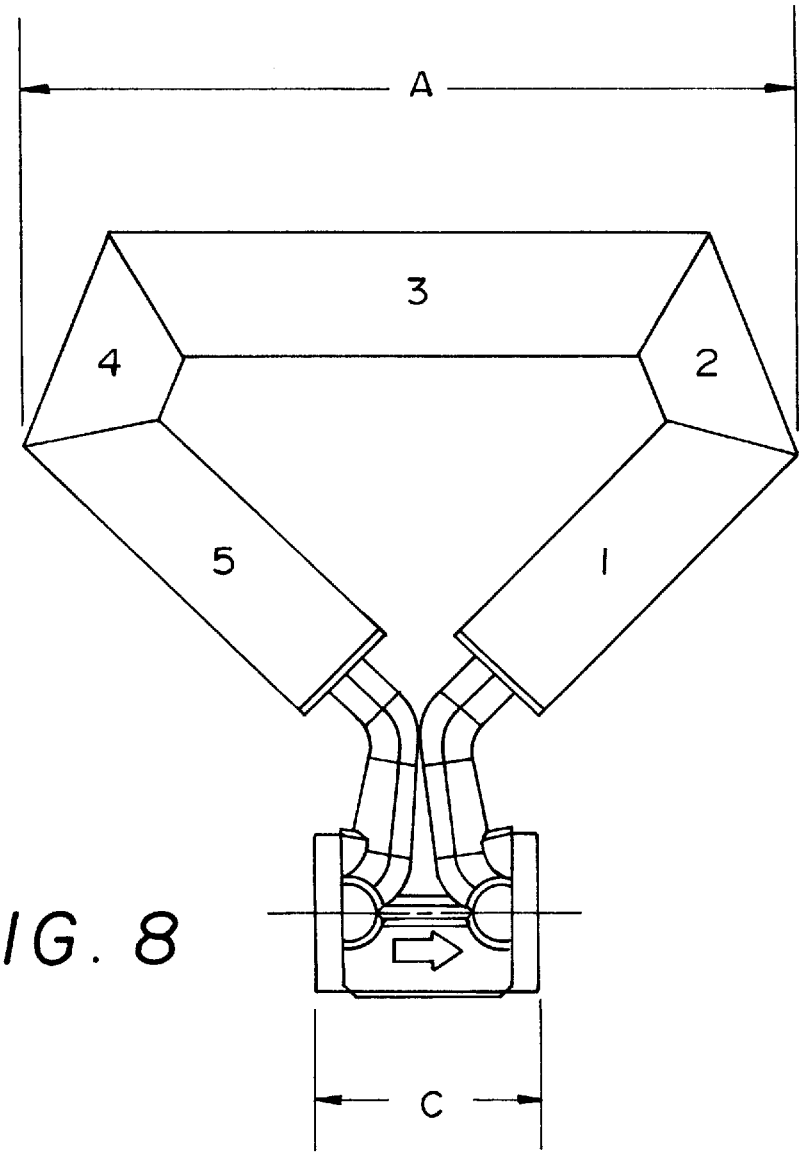
FIG. 8 illustrates another optional high pressure case design which is preferred based on cost and ease of fabrication.

FIG. 1 illustrates a preferred embodiment of a Coriolis mass flow meter of optimized modified U-shape and motion sensor positioning and mounting. As in the current commercial meters, the flow conduits 112 are solidly mounted to the manifold 130 at points 131. Brace bars 122, are solidly mounted to the flow conduits 112, thereby defining oscillation axes B' when the flow conduits 112 are driven in tuning fork fashion by driver 114. When flowable material flows through conduits 112, the Coriolis forces cause the conduits to deflect about deflection axes A'. Electrical connectors 125 from the driver, 126 from motion sensors 118, and 127 from motion sensors 116 may be connected and supported in stable stress minimizing fashion to bracket 128 as shown, or alternatively the bracket may be dispensed with as discussed hereinafter, in favor of printed circuit boards mounted to the case. The connectors shown in FIG. 1 are individual wires or ribbon-shaped flexible connectors with embedded wires, which are mounted in a stable, stress minimizing half-loop shape. It is contemplated that flexible connectors, as described in U.S. patent application Ser. No. 865,715, filed May 22, 1986, now abandoned; its continuation U.S. patent application Ser. No. 272,209, filed Nov. 17, 1988, now abandoned, and its continuation U.S. patent application Ser. No. 337,324, fled Jul. 10, 1989, may be used. Such flexible connectors also provide a stable, stress minimizing half-loop shape. In FIG. 1, experimental motion sensors 116 are located at the ends of the inlet or outlet leg 117 just before the bend. Motion sensor 118 are located at a position determined by modal analysis according to this invention, which effectively minimizes the influence of external forces. In a commercial meter embodiment, only motion sensors 118 would be present and motion sensors 116, used experimentally for comparison purposes, would be eliminated. The meter of FIG. 1 includes case 140 which encloses the flow conduit and associated attachments and is fixed to the manifold 130, but it is contemplated that a meter case as shown in FIG. 4 or FIG. 8 and described below might preferably be used.

Another feature of the flow meter design for the embodiment of FIG. 1 which minimizes the effects of external forces involves balancing of the flow conduits and their attachments and employing reduced mass sensor and drive components.

In Coriolis mass flow meters, the flow conduits serve as springs, with the spring force acting predominantly on the inlet and outlet legs. The flow conduits of the FIG. 1 embodiment are of modified U-shape having no permanent deformation from bending in the inlet and outlet legs. No bending during the fabrication process results in the absence of permanent deformation in the four regions in which spring forces act in the double conduit meters. As a result, all four regions display essentially the same response to spring forces if similar materials of essentially the same dimensions are used. This improves the ability of the flow meter manufacturer to balance the flow conduits. Balance of the flow conduits is further enhanced by decreasing the masses of the motion sensors and driver by using light mass magnets and coils and reducing the size of their mountings.

The motion sensors and driven are comprised, as in current commercial meters, of a magnet and a coil. The sensors are of the type disclosed in U.S. Pat. No. 4,422,338 which linearly track the entire movement of the conduit throughout its oscillation pathway. In the FIG. 1 embodiment and in other embodiments of this invention, the total mass of these sensors and of the driver are reduced over their total mass in current commercial meter embodiments by a factor of at least about 4 and preferably by a factor of 5 to 6 or more. This reduction in mass is accomplished by use of a lightweight bobbin having molded pin connections and by winding the coil with 50 gauge wire while continuing to use the same mass magnets. The lightweight sensors and driver are mounted directly on the flow conduits, thus eliminating mounting brackets. The lightweight coil used, e.g., in a meter embodiment of the size and shape of that in FIG. 1 with a flow tube of approximately 0.25 inches outside diameter, has a mass of approximately 300 milligrams. Prior coils used with comparable sized mass flow meters made pursuant to U.S. Pat. Nos. Re 31,450, 4,422,338 and 4,491,025 and having approximately the same flow tube outside diameter size had a mass of approximately 963 milligrams. In the same sized meter embodiment according to FIG. 1, the new assemblies add a total of approximately 3.9 grams to the mass flow meter (1 driver coil and 2 sensors coils at 300 grams each, and 3 magnets at 1 gram each). By contrast, in comparable earlier commercial embodiments, the corresponding assemblies added 22.2 grams (1 driver coil, 2 sensor coils, 1 coil bracket, 1 magnet bracket and 3 magnets) to the mass flow meter.

Figure 1A:
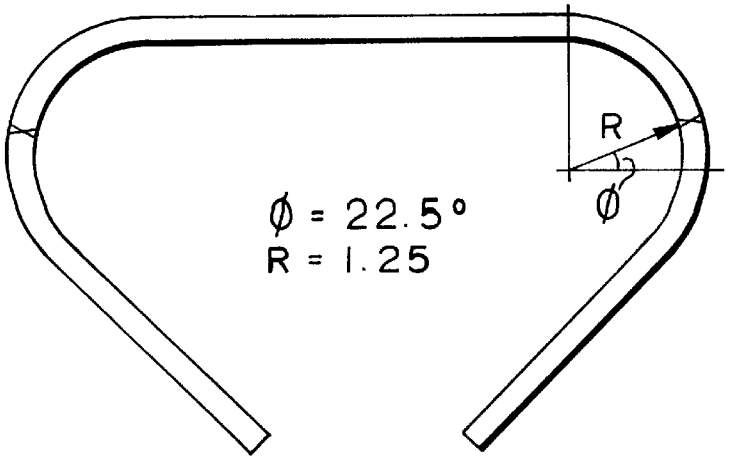
FIG. 1A illustrates the location of the motion sensors as a result of modal analysis for the FIG. 1 embodiment.

For the FIG. 1 embodiment, a representative modal analysis was performed. As one result thereof, the second out of phase twist mode node and the third out of phase bending mode node were located on a flow conduit having the dimensions and properties shown in Table 1 below and on FIG. 1A:

TABLE I

| | |
|---|---|
| Conduit material: | 316L stainless steel |
| Conduit length: | 16 inches |
| Conduit outer diameter: | .25 inch |
| Conduit wall thickness: | .010 inch |
| Inlet leg: | 3 inches |
| Outlet leg: | 3 inches |
| Middle Section: | 5 inches |
| Bend radius: | 1.25 inches |

The resulting sensor location which is midway between the aforenamed mode nodes, was placed at 22.5° measured from the horizontal area extending from the bend random centerpost.

This resulting sensor location is not only between, but in the closest possible proximity to each of the two node points, on each side of the conduit. As those skilled in the art will readily appreciate, by performing modal analyses on flow conduits of other precise shapes, dimensions and materials, each of the node points for all of the modes enumerated above can be located and resulting sensor locations can readily be optimized.

In some embodiments of the improved meters of this invention, the fundamental driving frequency (the first out of phase bending mode) is increased relative to current commercially available flow meters made by applicants' assignee, thereby increasing the values of its harmonics. This results in better separation of the individual harmonics for the drive mode from that of other modes. In the FIG. 1 embodiment of the size stated, for example, the harmonics of the other five modes of interest are each separated from harmonics of the driving frequency by at least 20 Hz, for all frequencies below 2000 Hz.

In the FIG. 1 embodiment, the placement of the brace bars has the effect of separating the first in phase bending frequency from the fundamental driving frequency and thereby eliminating possible effects of excitation of the first in phase bending frequency. The effects of external forces operating at frequencies corresponding to the remaining four modes of interest are in part minimized by the balanced flow conduit design. In addition, the effects of the second out of phase twist mode and the third out of phase bending mode are also minimized in this embodiment by locating the motion sensors between, but in close proximity to the nodes of both these two modes, which nodes happen to be located close together. It is contemplated that other location selections can be made to minimize the effects of those modes that most affect stability of any particular conduit, taking into account through modal analysis its size, shape and material.

Testing of the FIG. 1 embodiment of the current commercial Model D meters manufactured by applicants' assignee and of current commercial Coriolis mass flow meters manufactured by others at varying fluid pressures ranging from less than 10 psi up to about 1000 psi established that at fluid pressures approaching 1000 psi, variations in drive frequency and twist frequency are induced which adversely affect the accuracy of mass flow measurements. To date, it has been determined that these effects of high fluid pressure are minimized by increasing the flow tube wall thickness by approximately 20% and by enclosing the flow tube assembly in a specially designed fluid-pressure-insensitive case, as discussed below.

Applying the wall thickness increase to the meter embodiment of FIG. 1, for example, for a tube of outside diameter 0.230 inches, the wall thickness is increased from about 0.010 inches to about 0.012 inches in order to minimize instabilities caused by high fluid pressure.

Figure 2A:
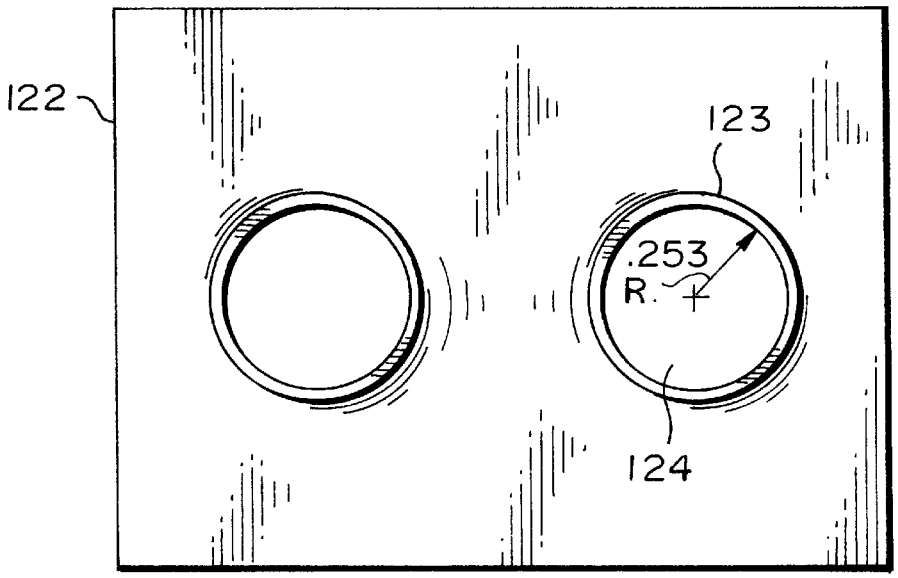
FIGS. 2A and 2B illustrates an option level brace bar configuration.
Figure 2B:
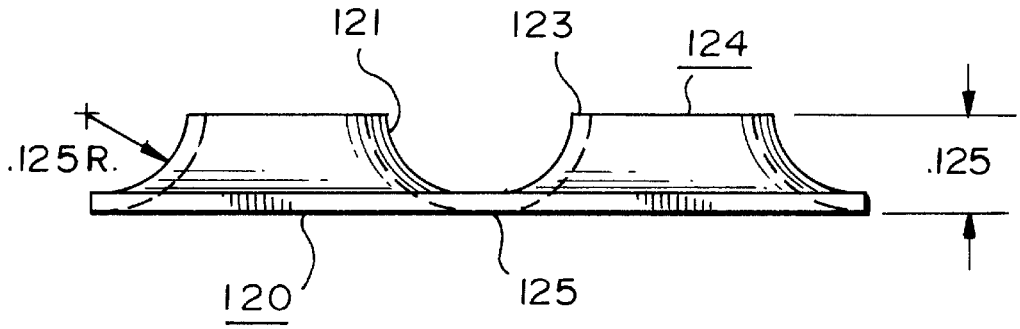

FIG. 2 shows an optional brace bar design according to this invention. Each brace bar 122 is formed, as by punching a piece of metal (e.g., 316L or 304L stainless steel) or other suitable material, to provide two sleeves with nippled transitions 121 from holes having the outer diameter of flow conduit (hole 124), to larger holes 120. These brace bars are contemplated to be brazed or welded to the flow conduits in order to reduce stress concentrations at the point of attachment 123, the primary locus about which the conduit is oscillated. It is within the scope of the present invention, however, to utilize conventional brace bars as earlier disclosed in the art.

Figure 3:
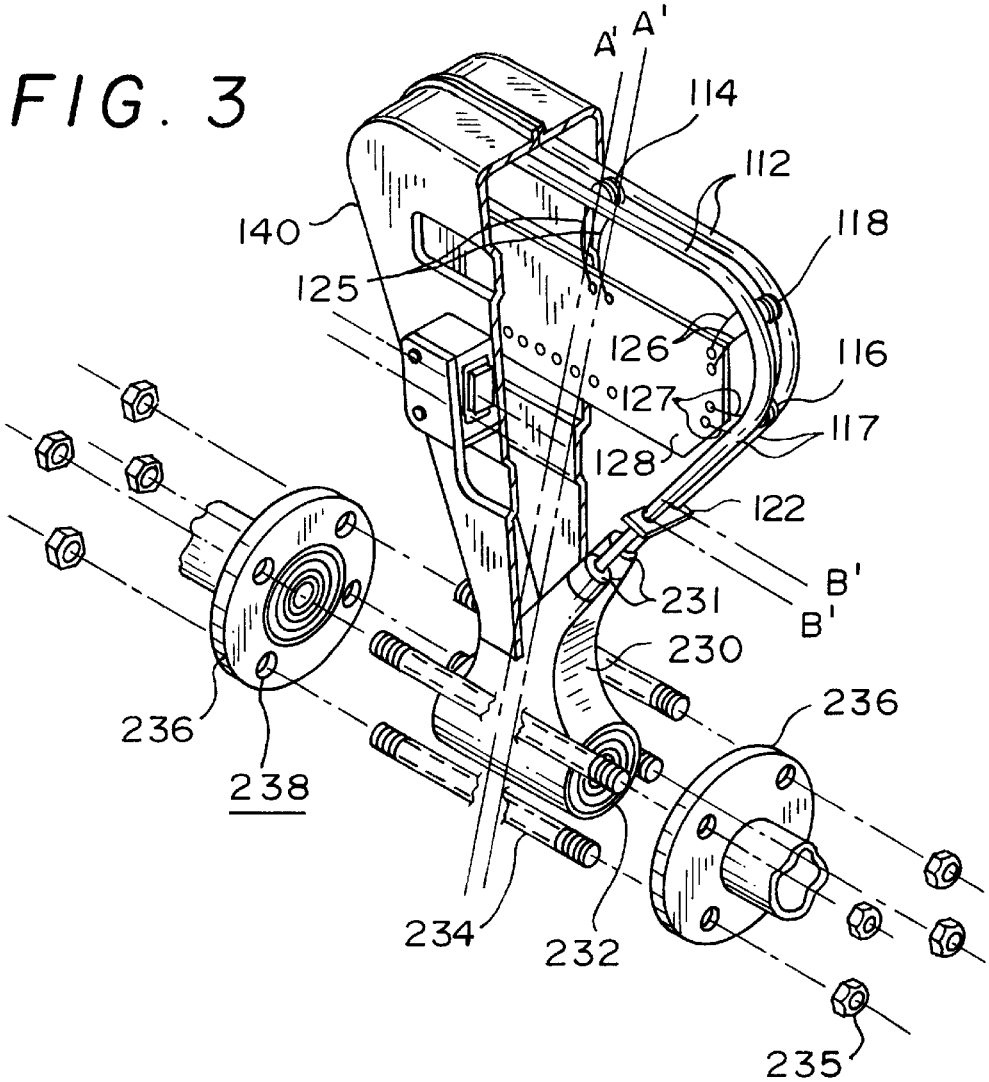
FIG. 3 illustrates an optimized Coriolis mass flow meter of this invention with a wafer manifold structure partially within a case as shown by FIG. 4.

FIG. 3 shows an optimized Coriolis meter as in FIG. 1, with an exploded view of the process line attachment. Instead of the typical prior art flanged manifold, a novel wafer flangeless structure 230 is provided for which the ends 232 can be bolted between the existing flanges in a manufacturing or other commercial process line, by means of threaded connectors 134 passing through flange holes 238 and held in place by nuts 235.

FIG. 4 illustrates one form of case which minimizes pressure effects. This form can be used to enclose the entire flow conduit and sensor attachment assembly. It comprises a pipe 350 of sufficient diameter to enclose the flow conduits 312, driver, motion sensors and associated wire attachments (not shown). The pipe is bent in the shape of the flow conduit. It is then cut longitudinally into two essentially equal halves. The flow conduits 312 are fitted into it along with the associated driver, motion sensors and wiring. The other half is fitted over this combined assembly and welded along the two longitudinal seams and at the connections to the manifold. Thus, a pressure tight case is provided which is suitable for applications involving hazardous fluid containment and able to withstand significant pressures on the order of at least 300 psi and up to 500 pounds per square inch or more. For some embodiments, a printed circuit board may be attached to the inside of the case, with flexible connections running from the driver and motion sensors to the circuit board. A junction box may then be attached to the case and connected to the circuit board by wires which can be run through pressure tight fittings at the top of the case. The junction box is in turn connected to means for processing electronically the signals from the sensors to give mass flow readout values and, optionally fluid density readout values.

Figure 9:
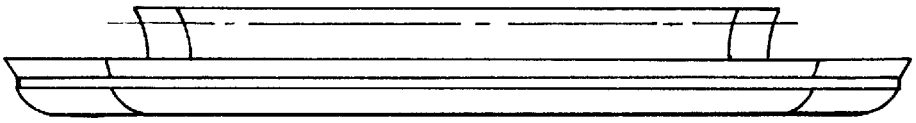
FIG. 9 gives further detail regarding the FIG. 8 case design.

An alternative case, preferred for ease of fabrication, is shown in FIG. 8 and a section thereof is shown in FIG. 9. This form of case is made from stamped steel pieces of half-circular cross section as shown in FIG. 9, (which depicts piece 2 or 4 from FIG. 8) welded together to form the case. As specifically applied to the embodiment of FIG. 1, this case is formed of ten pieces labelled 1–10 on FIG. 8 which are assembled in the following manner:

Five pieces (1, 2, 3, 4 and 5 as labelled on FIG. 8) comprising one half of the case—i.e., when assembled covering one half the outer circumference of the flow tube—are welded to the support comprising the inlet-outlet manifold of the flow tube. Printed circuit boards, not shown in any of the figures, are affixed to the case at locations as near as possible to the placement of the pick-off coil portions of the sensors on the flow tube and the pick-off coil terminals are connected to these printed circuit boards by flexures containing wires of the type referred to hereinabove or by individual half-loop shape wires. Wires are then run along the case to the center straight section of the case (i.e. section 3 which encloses the straight flow conduit section 112 of FIG. 1) where the wiring feed-through to the meter electronics is located. This feed-through, which is not shown in FIGS. 8 and 9, may comprise posts to which the wires are directly connected or may comprise a third printed circuit board to which the wires are connected and which is, in turn, connected to feed-through posts and then to a junction box, not shown, positioned on section 3 of the case at its midsection. After the wiring is completed, the remaining five piece (not shown in FIG. 8, which is a plan view of the case) are welded in place to one another, to the support and to the previously assembled and welded portion, preferably by means of automated welding. These latter five pieces comprise one half of the case. The welds between pieces are as shown by the lines on FIG. 8. In addition, welds are made along the inner and outer periphery of the case at seam lines which are not shown, but which connect the top and bottom halves of the case both inside the enclosure formed by the meter tube and support and outside that enclosure.

The case embodiments of FIGS. 4, and 8 are illustrative only. Those skilled in the art will readily recognize that similar cases can readily be fashioned to any size and shape of curved or straight tube Coriolis mass flow meter and that, depending upon the precise shape involved, the embodiment of FIGS. 8 and 9 may advantageously be made with other numbers of stamped steel half-circumferential pieces. As is also readily apparent, other wiring arrangements may be readily devised by those skilled in the art without departing from the essential principles of this invention.

Shaker table tests were performed to test the influence of external vibration forces and process line noise in exciting the flow conduit with its associated attachments. Such external forces are frequently present during plant operations. FIGS. 5A through 5F show experimental shaker table test results for a current commercial Micro Motion, Inc. Model D25 Coriolis mass flow meter. FIGS. 6A through 6F show results for similar tests for a current commercial Micro Motion, Inc. Model D40 meter. The Model D25 has a 0.172 inch inner diameter flow conduit; the D40 has a 0.230 inch inner diameter. FIGS. 7A through 7I show experimental test results for similar tests for a Coriolis mass flow meter similar to that shown in FIG. 1.

In each of FIGS. 5A through 7I, the x-axis is the axis through the meter flanges (i.e., parallel to the oscillation axis B'—B'), the y-axis is parallel to the plane of the flow conduits (i.e., parallel to the deformation axis A'—A'). The z-axis is perpendicular to the plane of the flow conduits. The parameters of interest are summarized in Table 2:

TABLE 2

| FIG. | Full Scale Flow Rate (lbm/min) | Vert. Scale Freq. Sweep (Hz) | Electronics output (mA) | Vert. Scale % of Full Scale Range | Motion Axis |
|---|---|---|---|---|---|
| 5A | 1.04 | | 4.20 | 10 | z |
| 5B | 10.4 | | 4.20 | 100 | z |
| 5C | — | 15–2000 | — | — | z |
| 5D | 1.04 | | 4.20 | 10 | x |
| 5E | 10.4 | | 4.20 | 100 | x |
| 5F | — | 15–2000 | — | — | x |
| 6A | 1.04 | | 4.20 | 10 | z |
| 6B | 10.4 | | 4.20 | 100 | z |
| 6C | — | 15–2000 | — | — | z |
| 6D | 1.04 | | 4.20 | 10 | x |
| 6E | 10.4 | | 4.20 | 100 | x |
| 6F | — | 15–2000 | — | — | x |
| 7A | 1.04 | | 4.20 | 10 | x |
| 7B | 10.4 | | 4.20 | 100 | x |
| 7C | — | 15–2000 | — | — | x |
| 7D | 1.04 | | 4.20 | 10 | z |
| 7E | 10.4 | | 4.20 | 100 | z |
| 7F | — | 15–2000 | — | — | z |
| 7G | 1.04 | | 4.20 | 10 | y |
| 7H | 10.4 | | 4.20 | 100 | y |
| 7I | — | 15–2000 | — | — | y |

These shaker table experiments were performed on complete mass flow meter assemblies without cases. The output indicated on the strip chart recordings of FIGS. 5A through 7I are of motion sensor readings in response to the corresponding external vibration. The sequence shown in each series of charts is the meter's response to a linear frequency ramp ranging from 15 Hz to 2 KHz and then vibration inputs at random frequencies (FIGS. 5C, 5F, 6C, 7C, 7F, 7I). The frequency ramp occurs over a ten minute period and random vibrations occur over an approximately five minute period. FIGS. 5A, 5B, 5D, 5E, 6A and 6B each indicate the influences of external vibrations of various frequencies in exciting harmonics of the six modes of motion of the D25 and D40 meters that are discussed above.

Figure 7D:
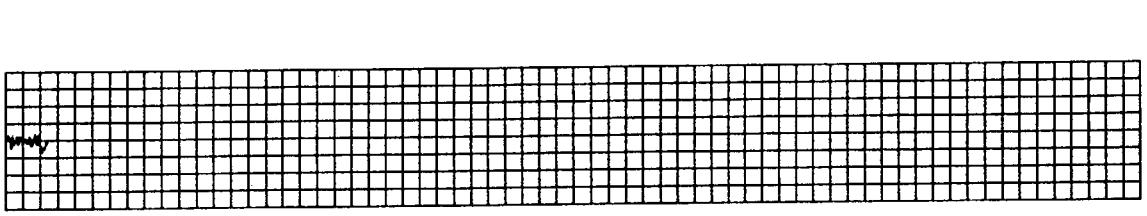
Figure 7H:
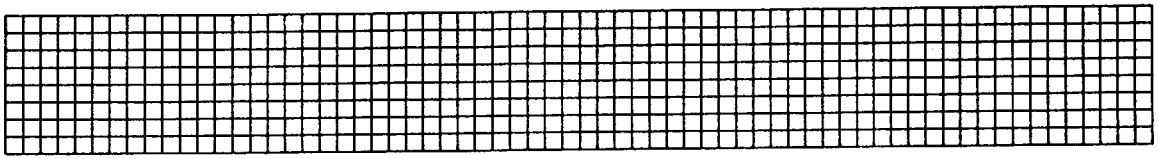

FIGS. 7A through 7F show susceptibility to excitation due to external vibrations of a meter of this invention of the FIG. 1 embodiment about the x and z axes (the same axes as in FIGS. 5A through 5F) and are to the same respective scale. FIGS. 7G through 7I are taken about the y-axis. (The random vibrations were conducted first in FIGS. 7D–7F). It is noted that the optimized meter shows dramatically reduced influence of external vibrations in exciting harmonics of the six modes of motion. Thus, the optimized design is shown effectively to isolate the meters from effects of external forces.

In addition, tests were performed to test the influence of external vibrations on zero stability. Such tests provided results for the stability of the time difference ($\Delta t$) measurement at no flow, the so-called jitter test. A frequency counter was used to directly measure the pulse width of an up/down counter prior to any averaging or filtering of the electronics. The test was performed on a shaker table using random frequency input over a range of accelerations in the x, y, and z directions. The results showed that, as the accelerations were increased, the influence of external vibrations resulted in pulse width divergence of one or more multiples of the average value from the average value for both the D25 and D40 meters. Such divergence for each axis, is markedly reduced for the optimized meter. Thus, as in the case of the vibration tests, the jitter tests showed that the optimized meter design effectively isolates the meters from the effects of external forces.

FIGS. 10A–10G inclusive are plots of further data obtained with a flow meter embodiment constructed as in FIG. 1, having conventional brace bars and a 20% thicker flow tube than comparably sized current commercial meters, as herein disclosed, with sensors placed in accordance with the teachings of this invention between, but as near as possible to the node points of the modes labelled as 4 and 5 herein above. As tested, the flow tube of this flow meter embodiment was half covered (i.e., one half of the circumference of the pipe) by a case of the type shown in FIGS. 8 and 9, and a junction box (not shown in the drawings) was appended to the outside of the case where the wires feed through the case. The junction box was conventionally connected to another box (called the "remote flow transmitter" or "RFT") containing the meter electronics and having readout panels for mass flow rate and density values, from which data was collected for FIGS. 10A–10D inclusive. The inner diameter of the flow tube wall on this meter embodiment was approximately 0.206 inches.

Figure 10:
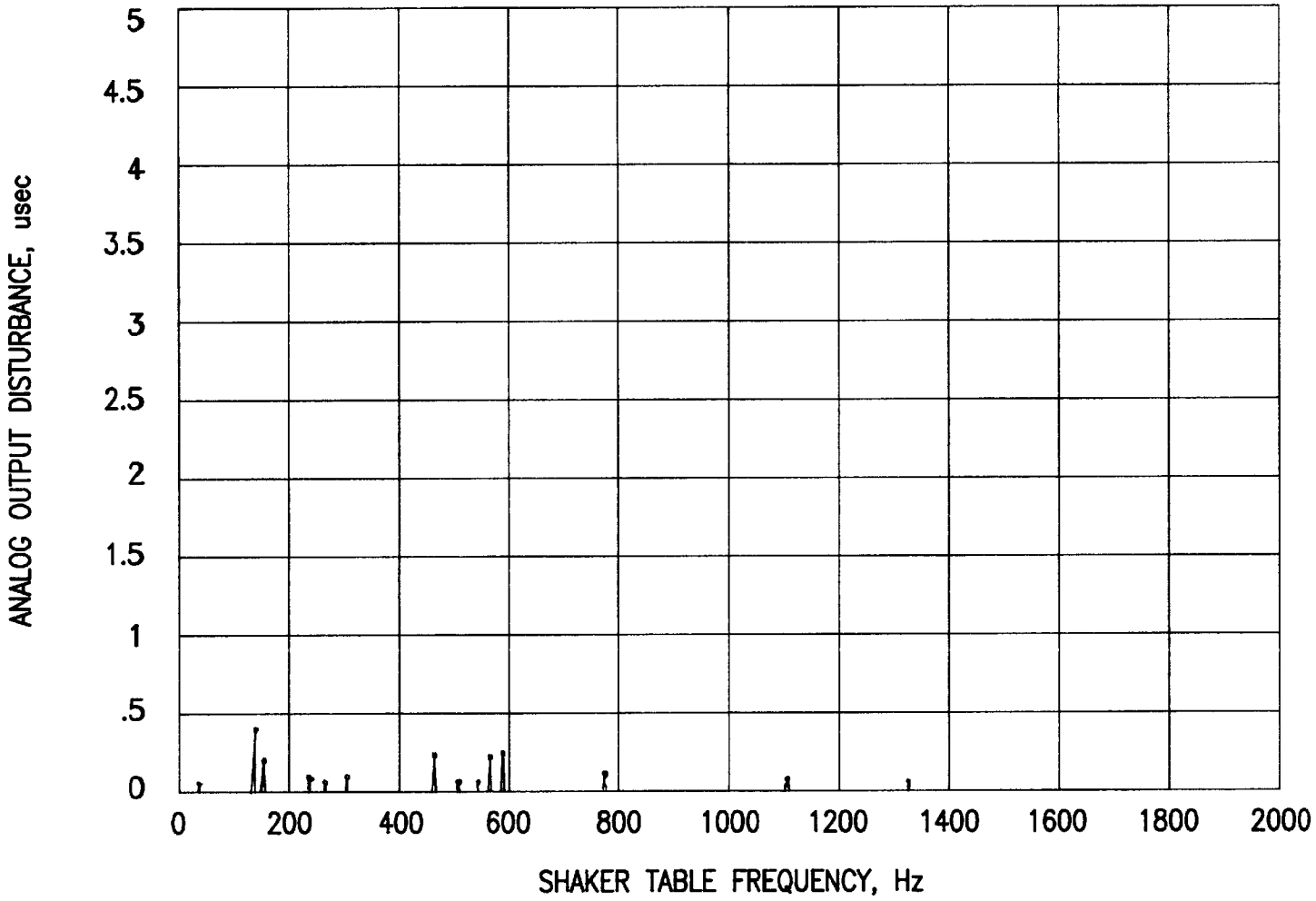
Figure 10A:
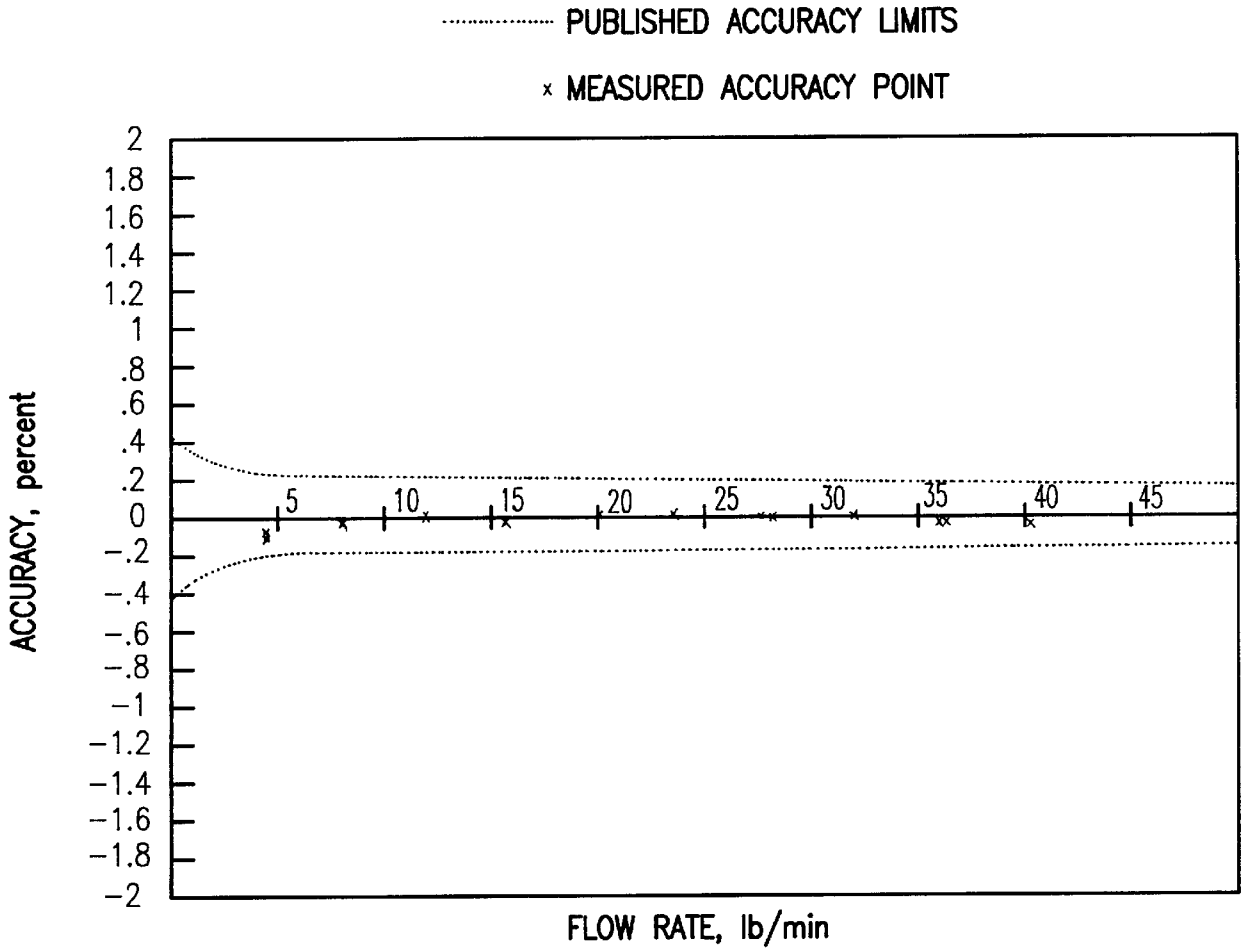
Figure 10B:
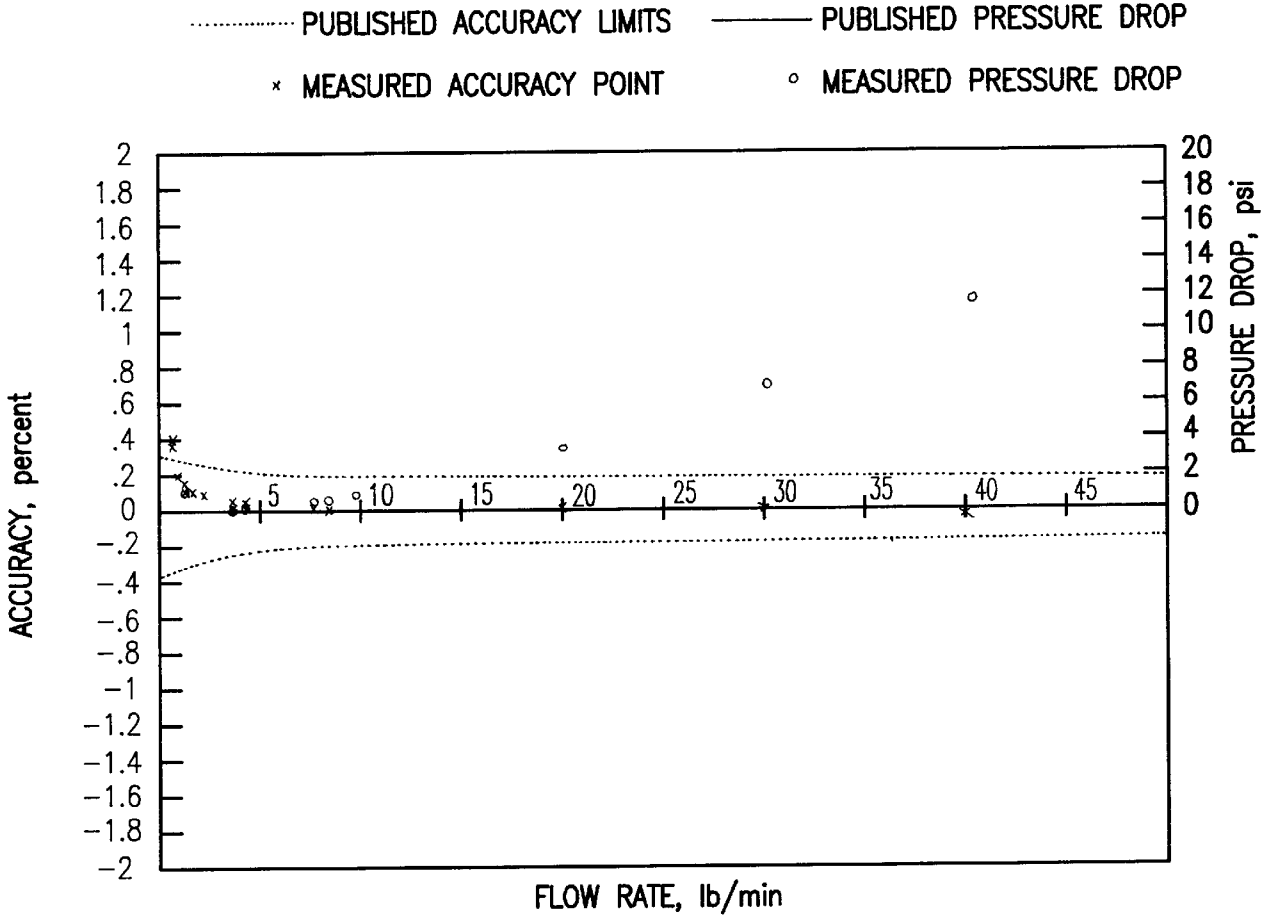

FIGS. 10A and 10B each represent calibration plots of accuracy versus flow rate using water at mass flow rates from 0 to 45 pounds per minute. FIG. 10A differs from FIG. 10B in that FIG. 10A represents a "22 point" calibration curve with the first measured points taken at mass flow rates of about 3 to 4 pounds per minute. FIG. 10B covers a "45 point" calibration curve in which more data points, especially for mass flow rates below 5 pounds per minute, (commencing at about 0.5 pound per minute) were collected.

FIG. 10B also shows fluid line pressure drop data as measured for mass flow rates from 0 to about 45 pounds per minute. FIGS. 10A and B combine to show that the meter embodiment of this invention performs well within the published accuracy values of ±0.2% which characterize the current commercial meters of applicants' assignee, Micro Motion, Inc. FIG. 10B also illustrates the very acceptable fluid line pressure drop performance of this meter embodiment.

Figure 10C:
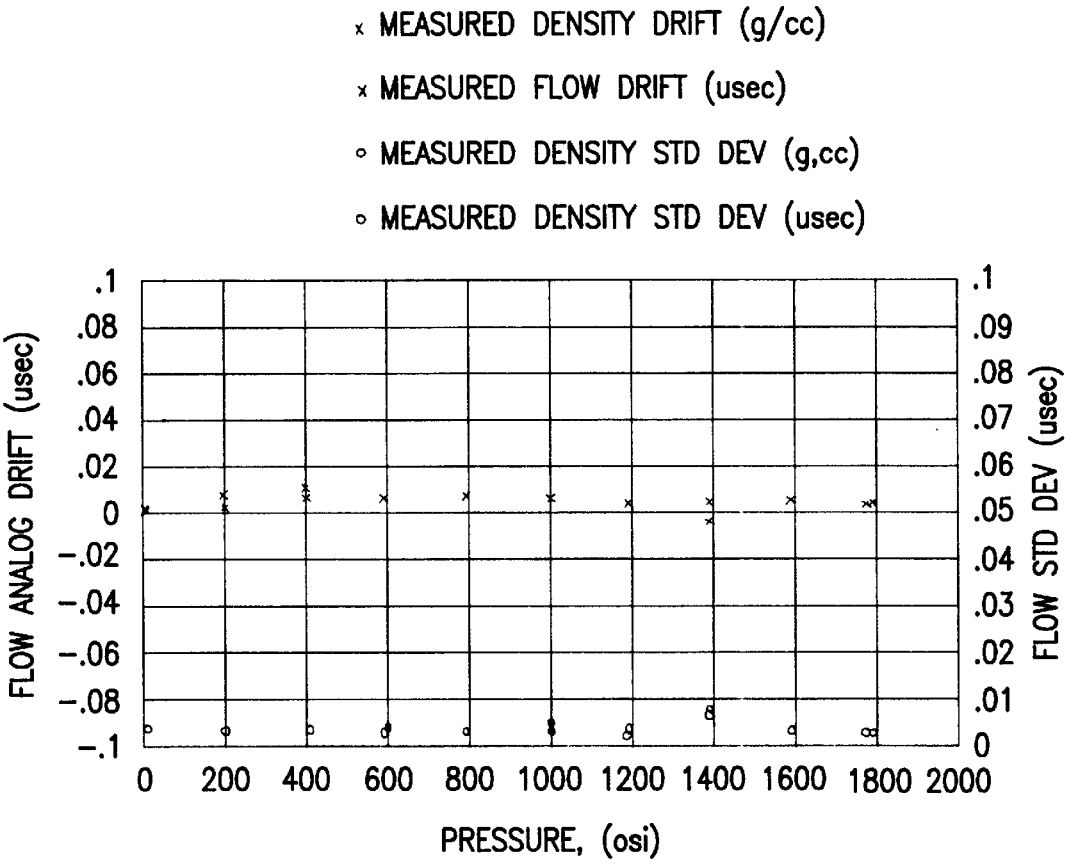
Figure 10D:
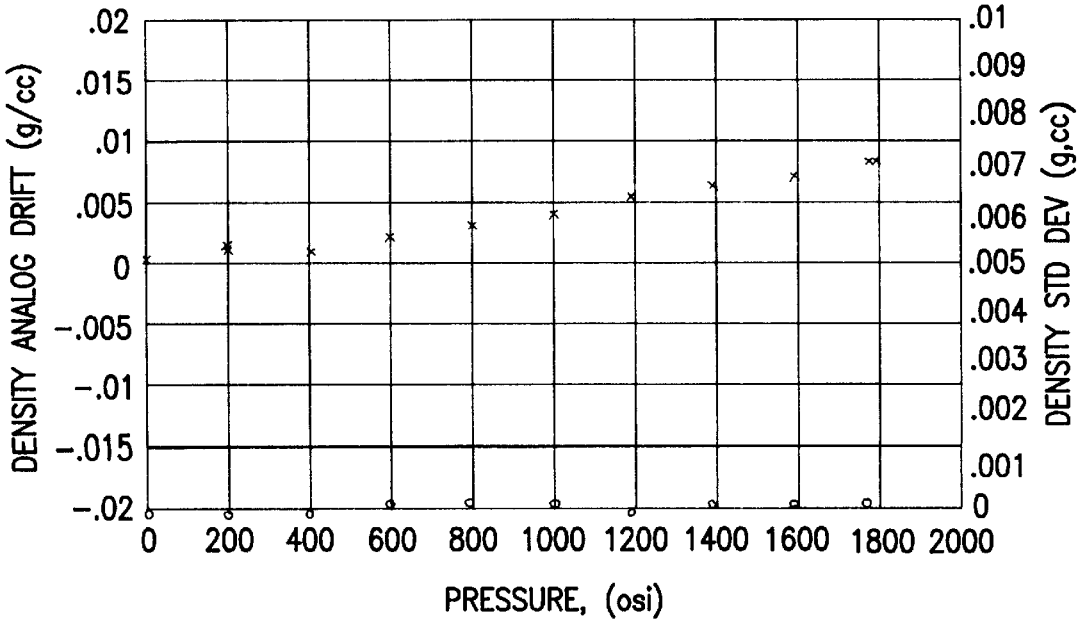

FIGS. 10C and 10D are, respectively, plots of measured mass flow rate and density analog drift values against fluid pressure of water at values from 0 to approximately 2000 psi. In each instance, a comparison appears on the plot of average historical standard deviation measurements for commercial mass flow meters of the D-series sold by Micro Motion, Inc. In FIG. 10C, flow rate analog drift and flow rate standard deviation data points are shown in units of seconds. In FIG. 10D, density analog drift and density standard deviation are shown in units of grams per cubic centimeter. In both cases, the data show the meter built in accordance with this invention to perform well within the measured standard deviation data.

Figure 10E:
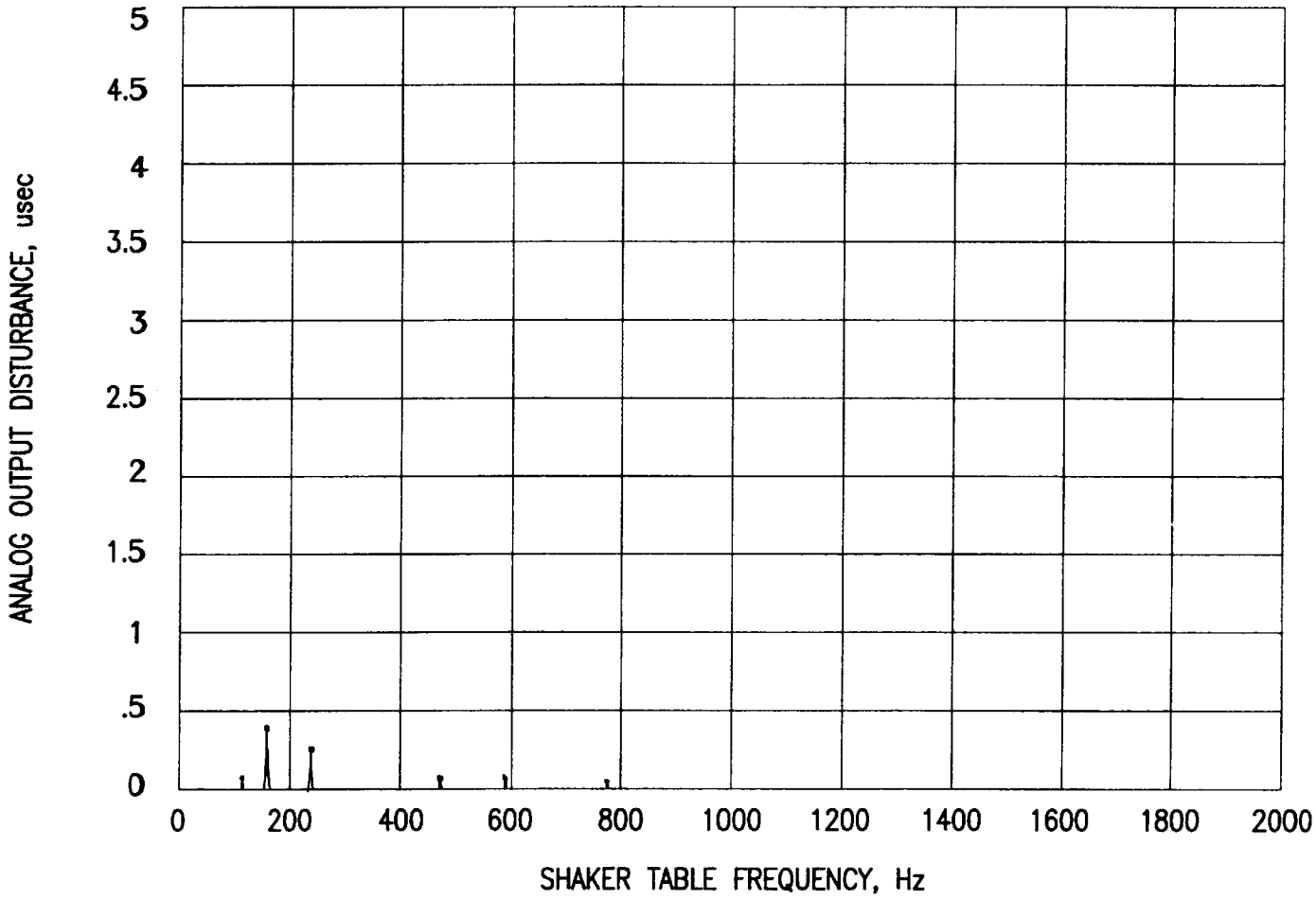
Figure 10F:
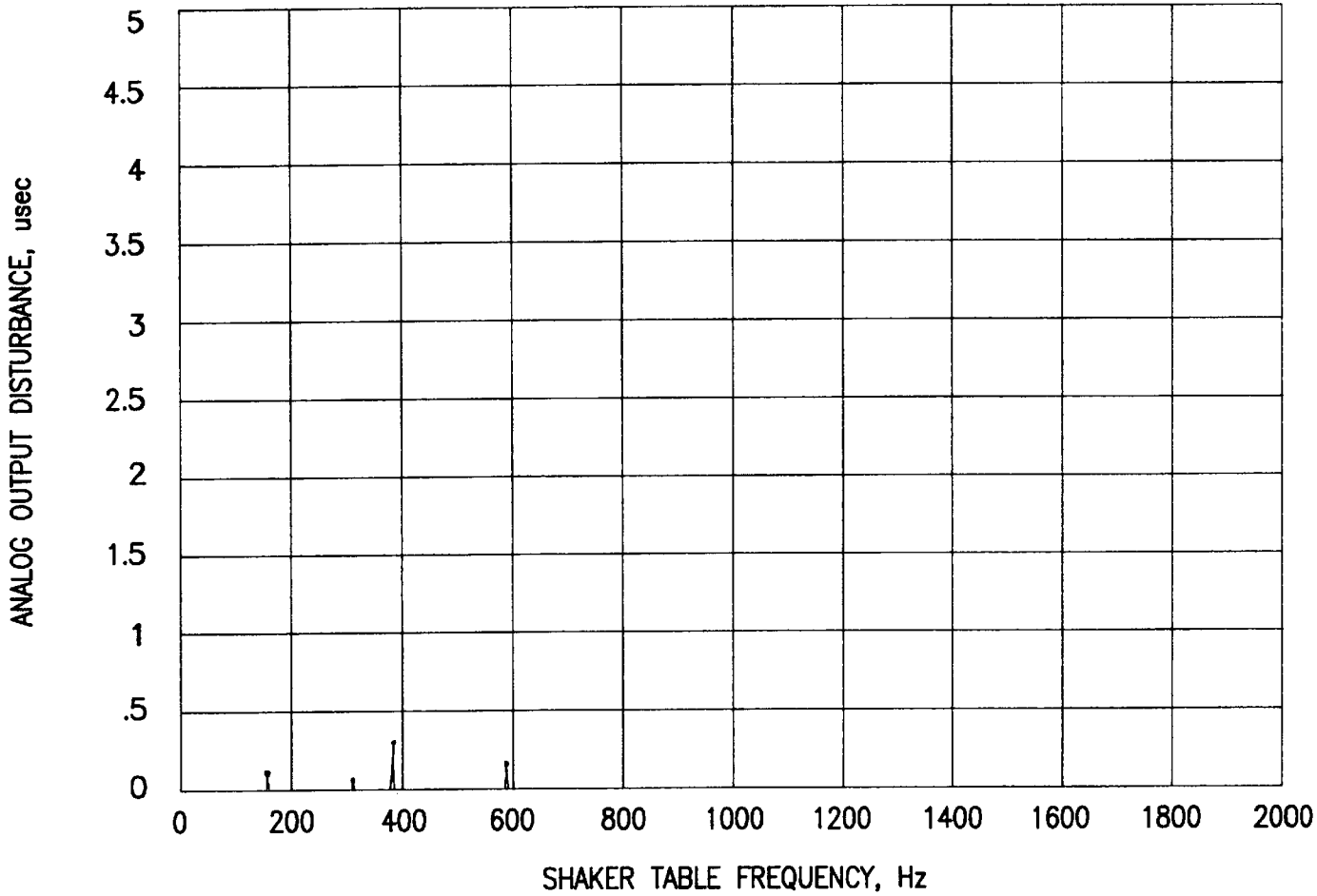
Figure 11A:
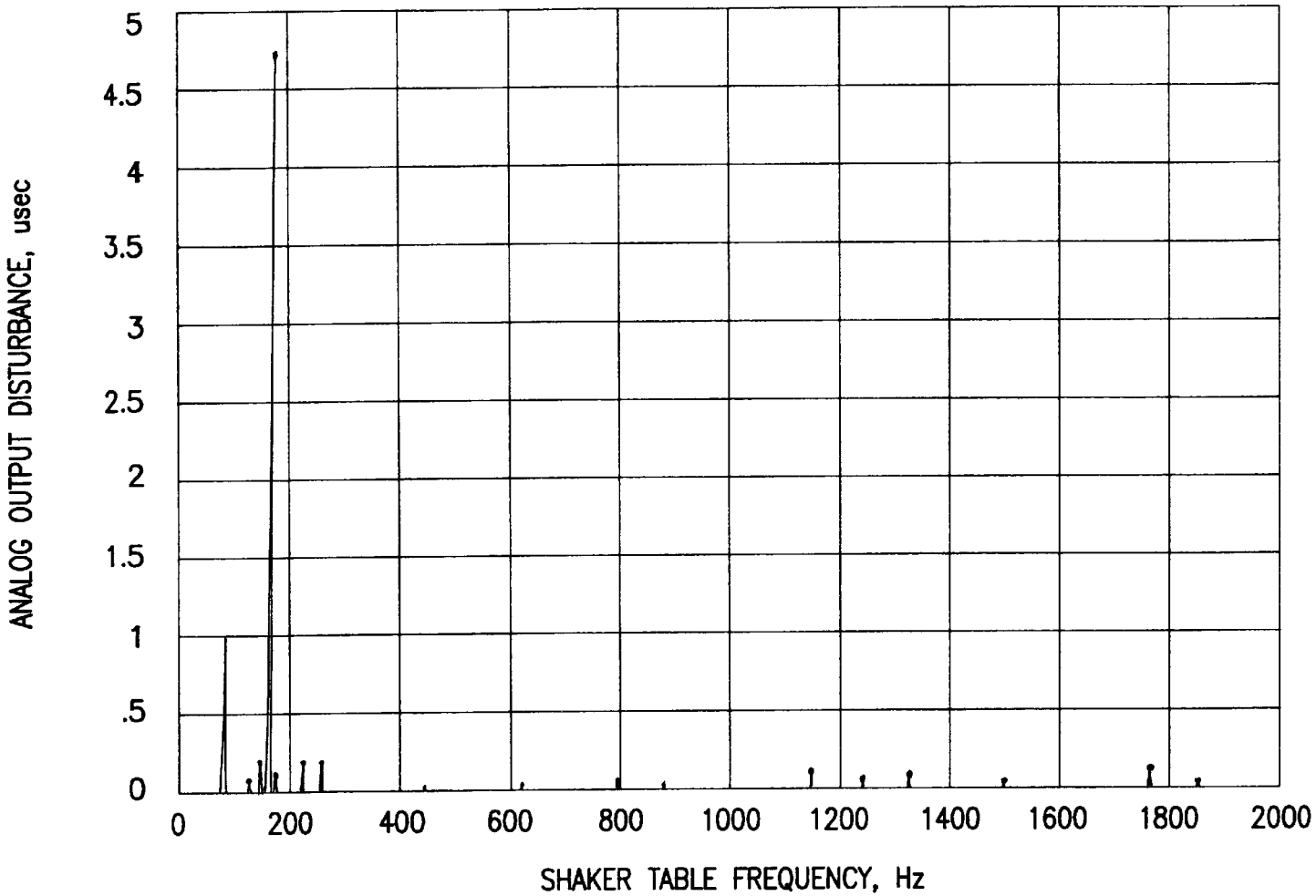
Figure 11B:
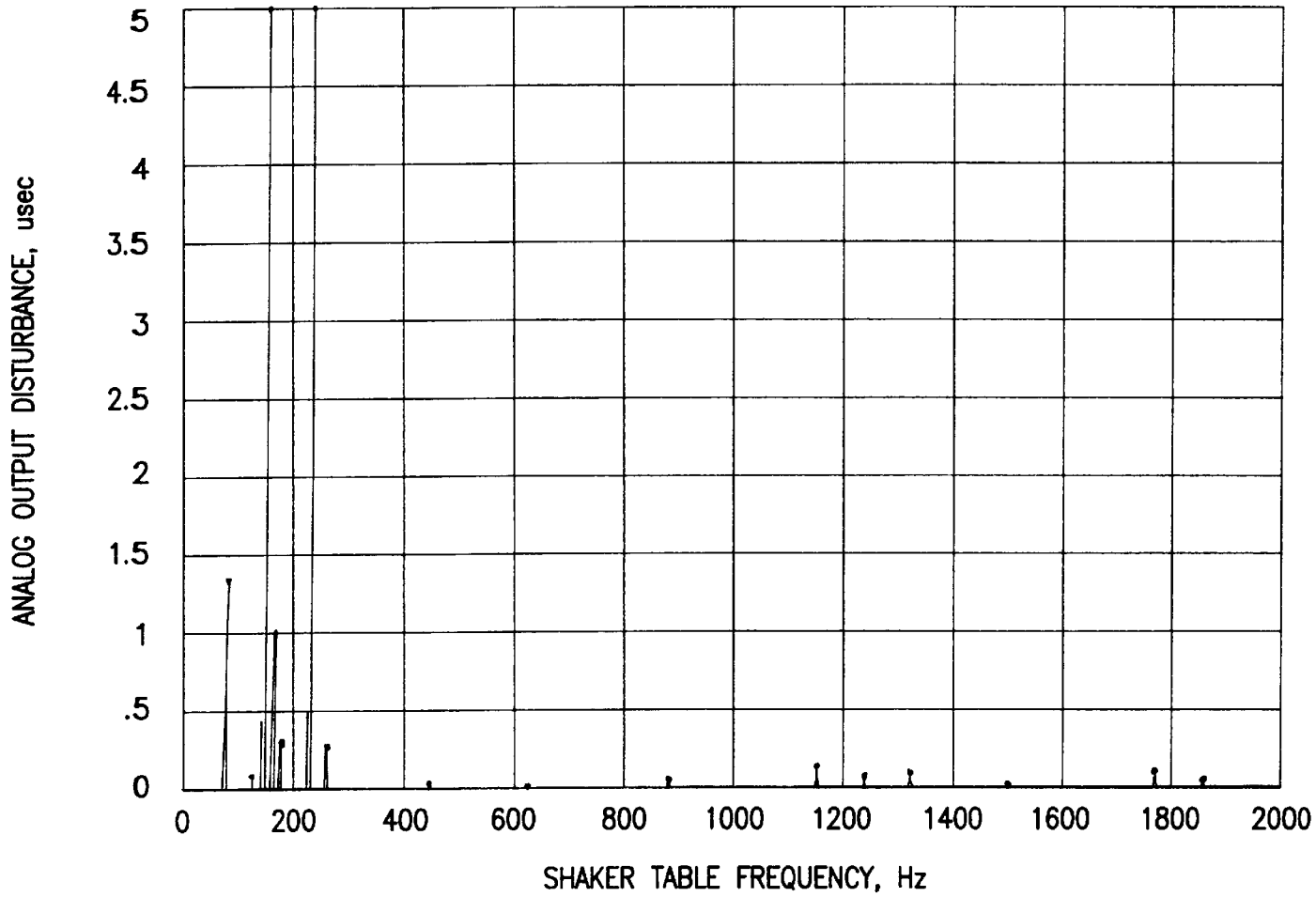
Figure 11C:
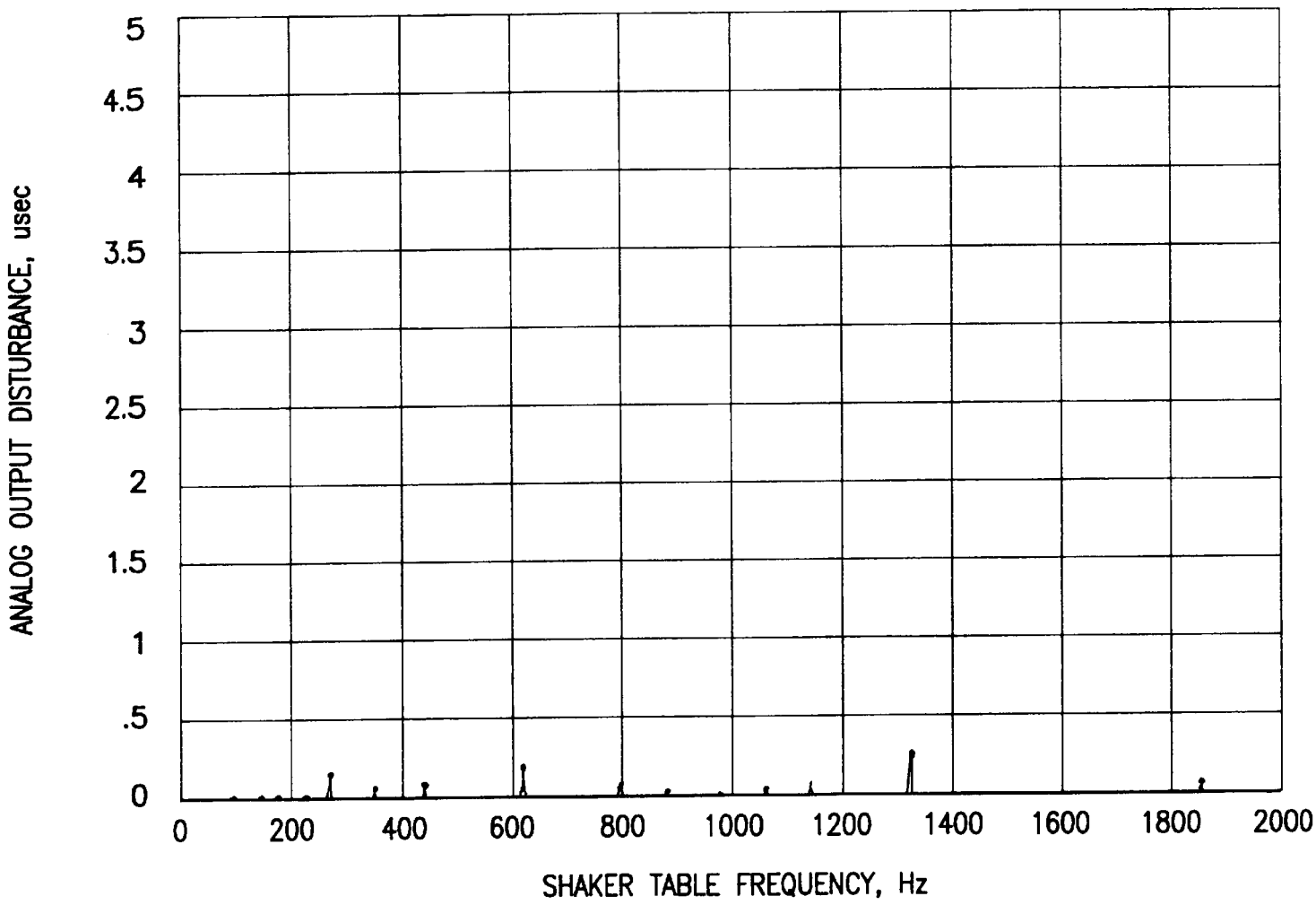
Figure 11D:
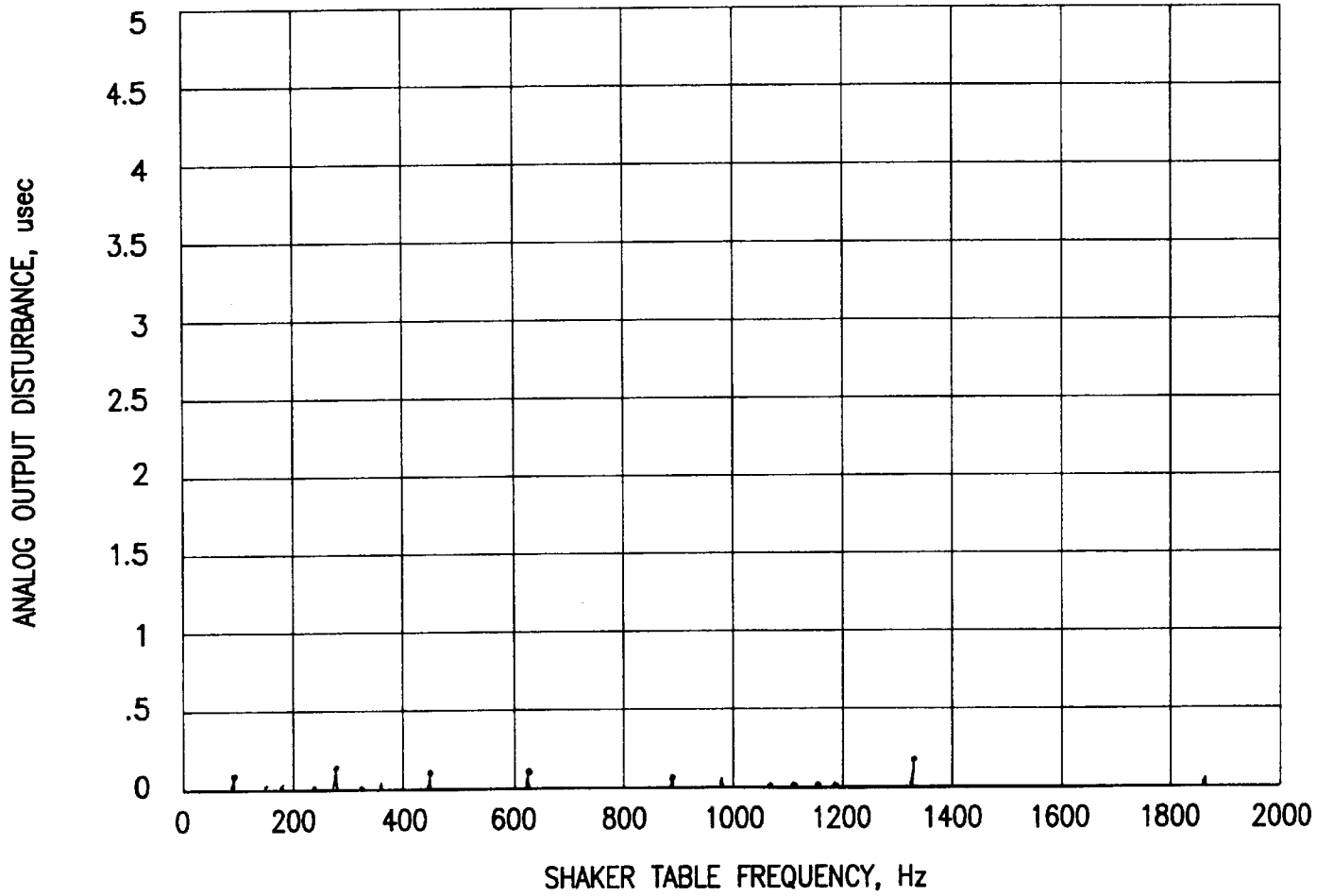
Figure 11E:
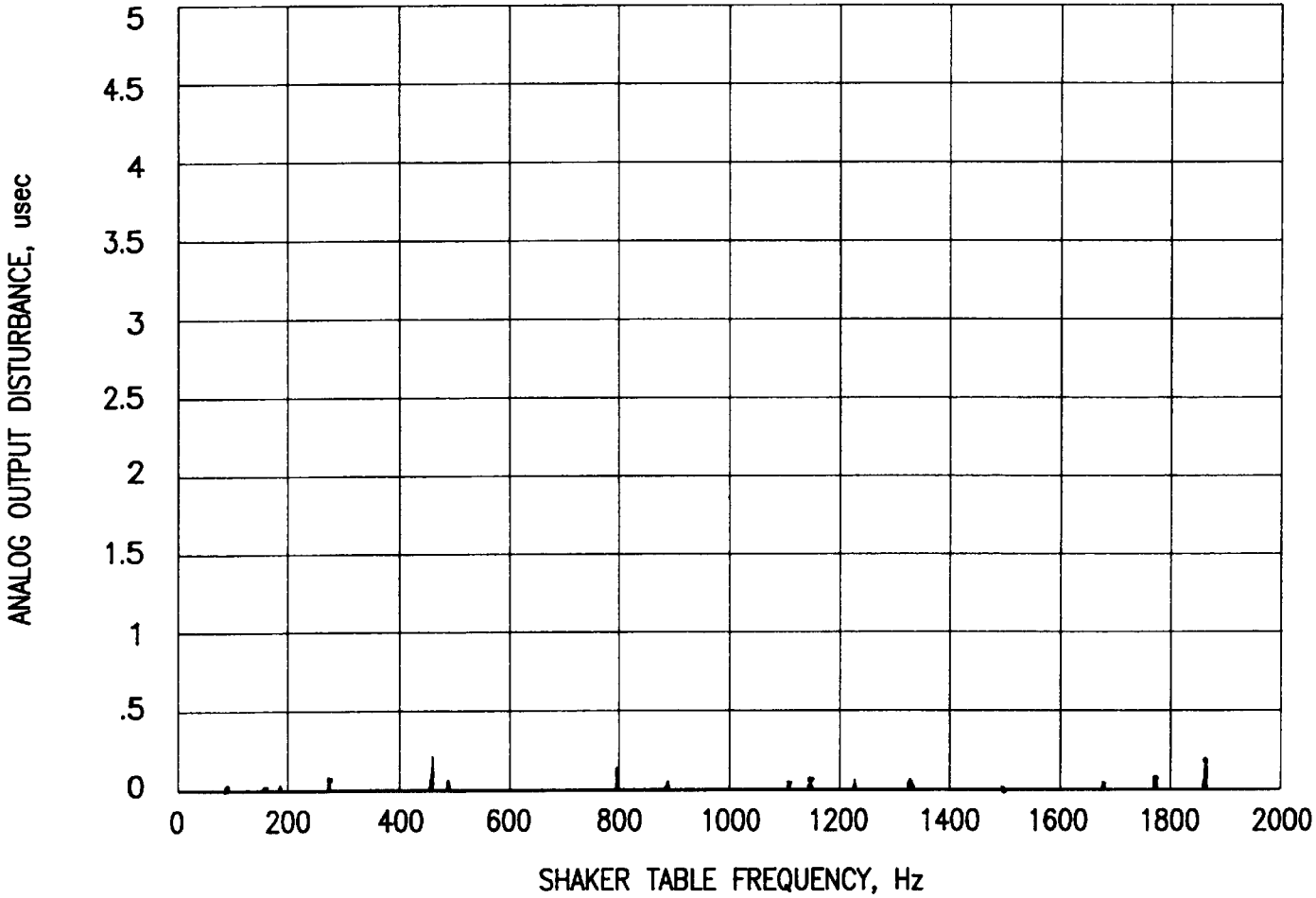
Figure 11F:
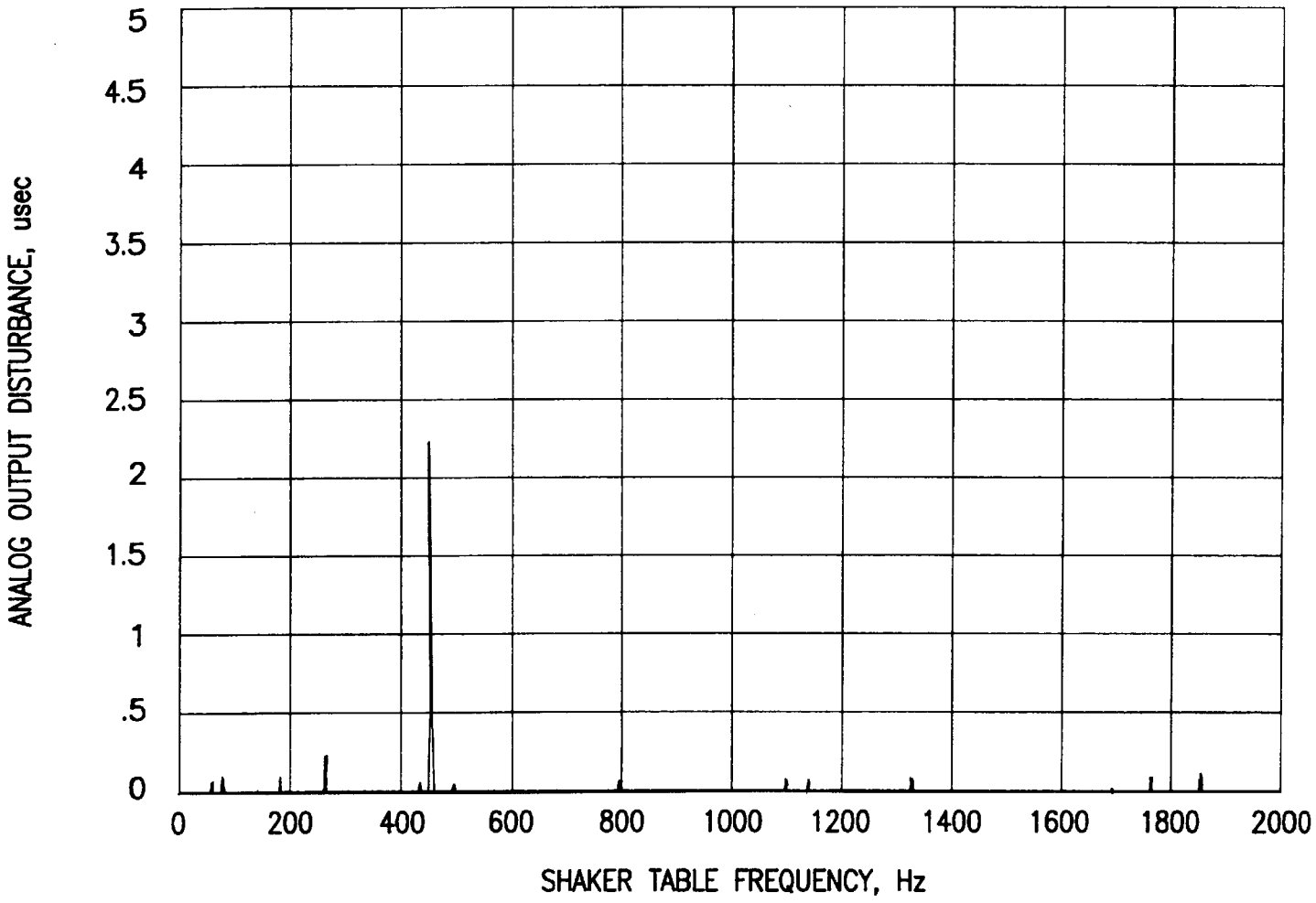
Figure 11G:
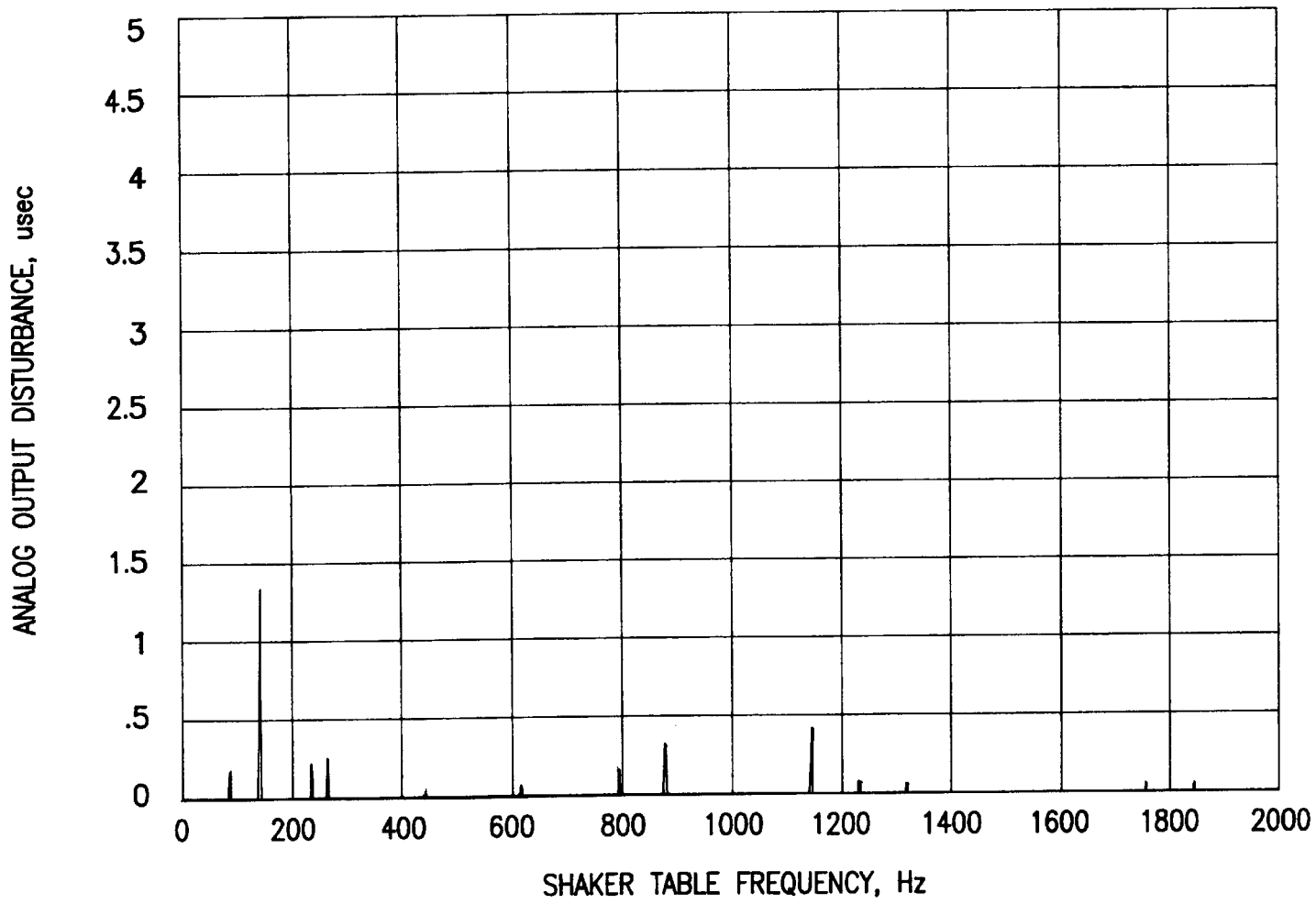
Figure 11H:
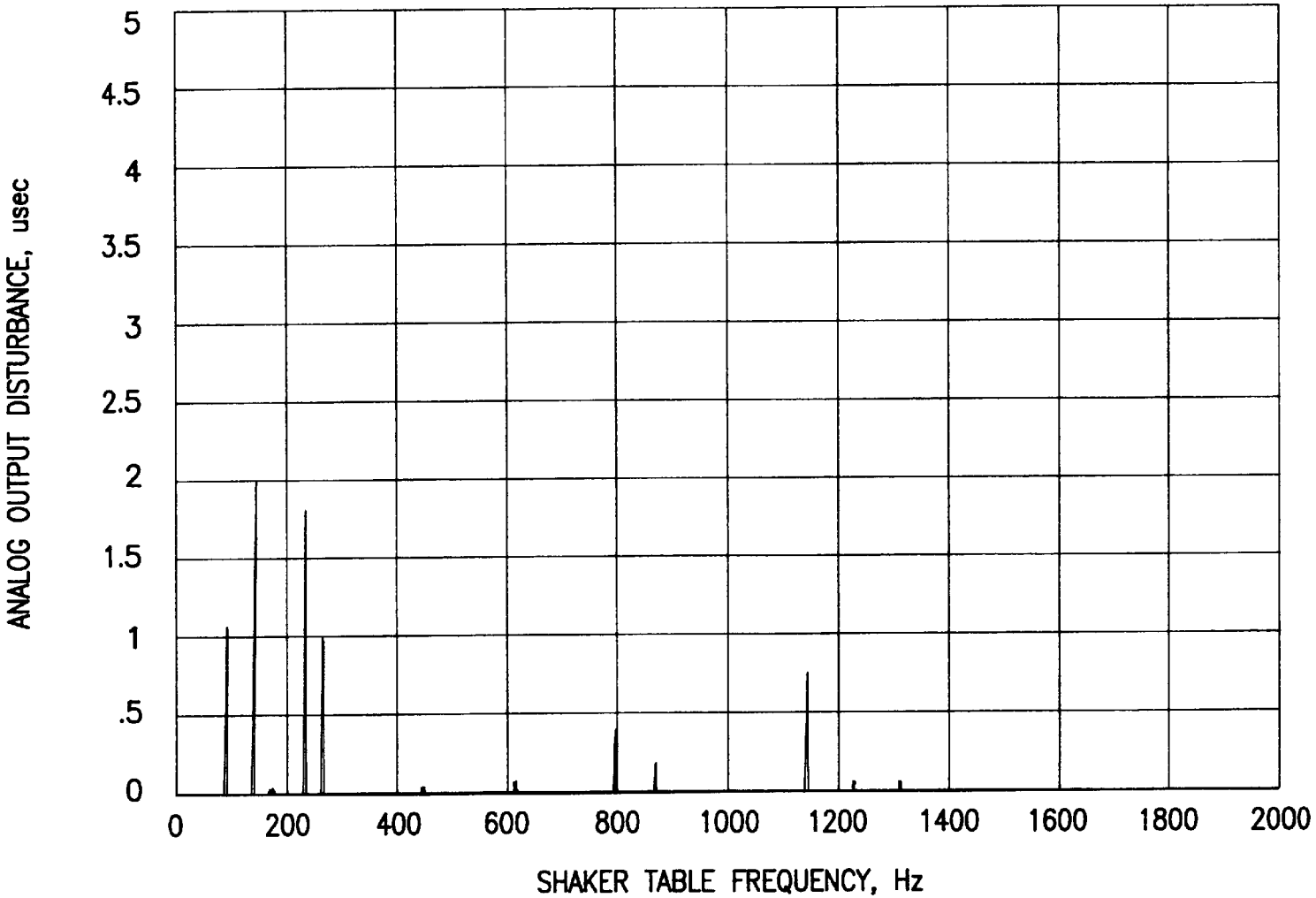
Figure 111:
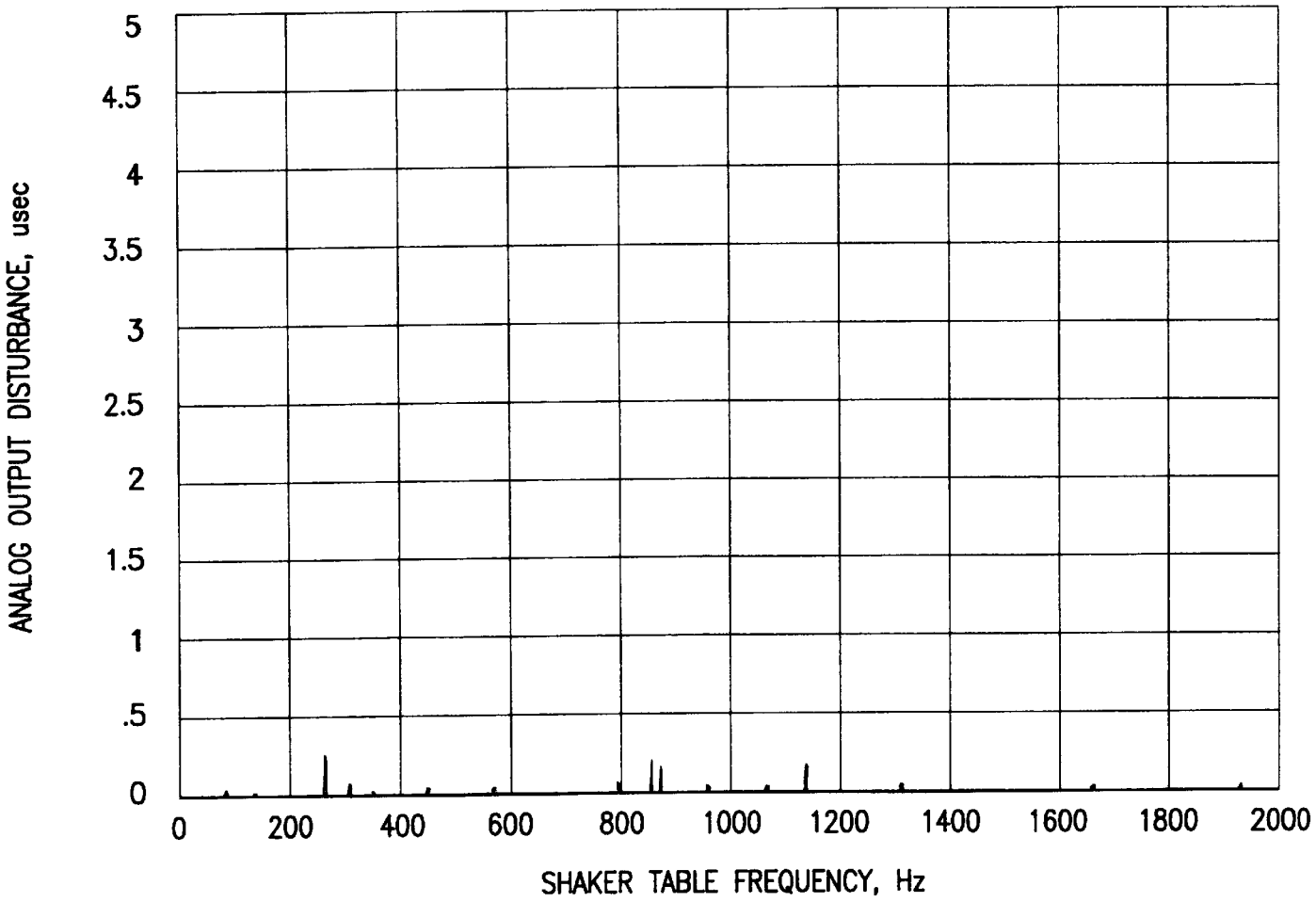
Figure 11J:
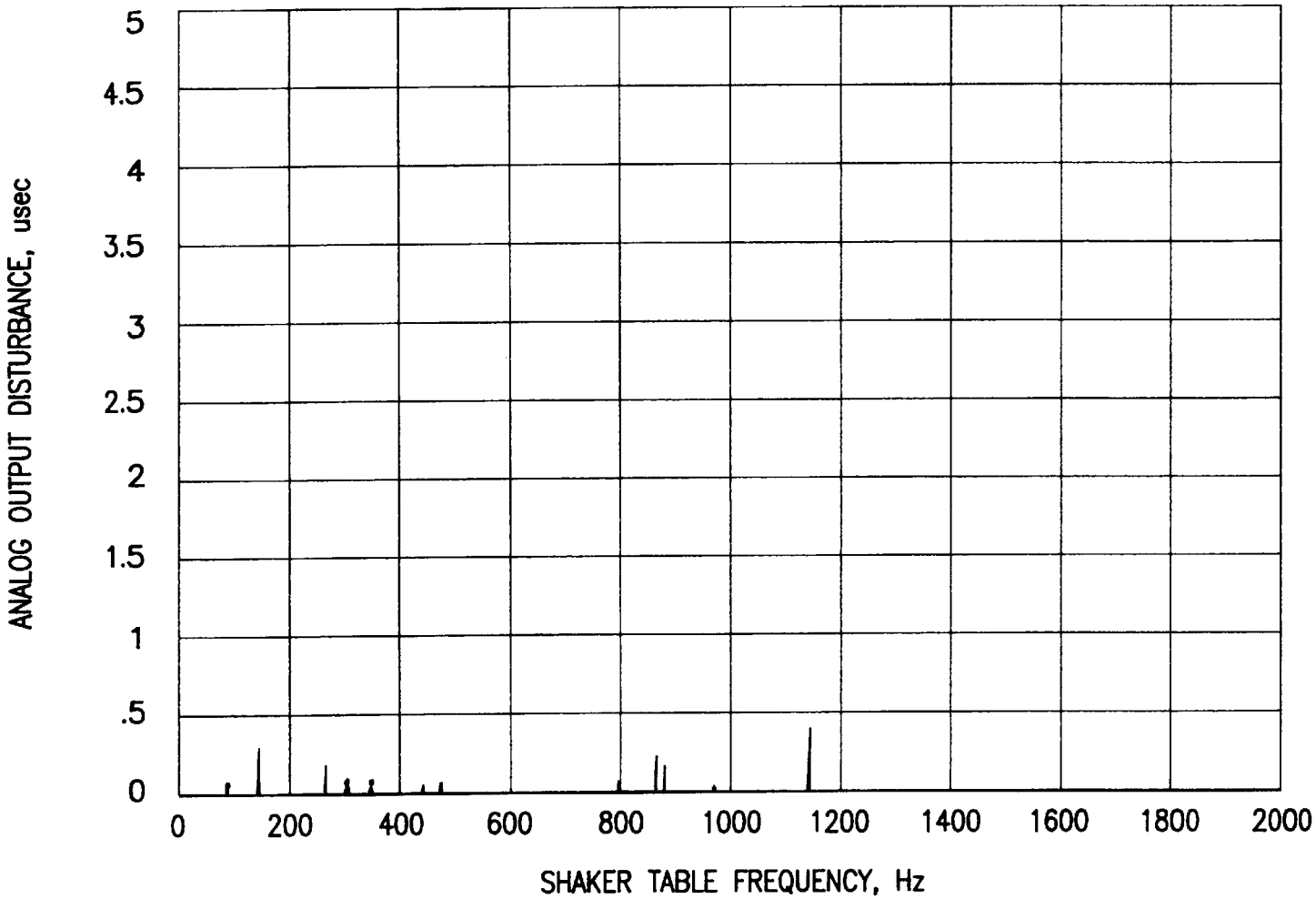
Figure 11K:
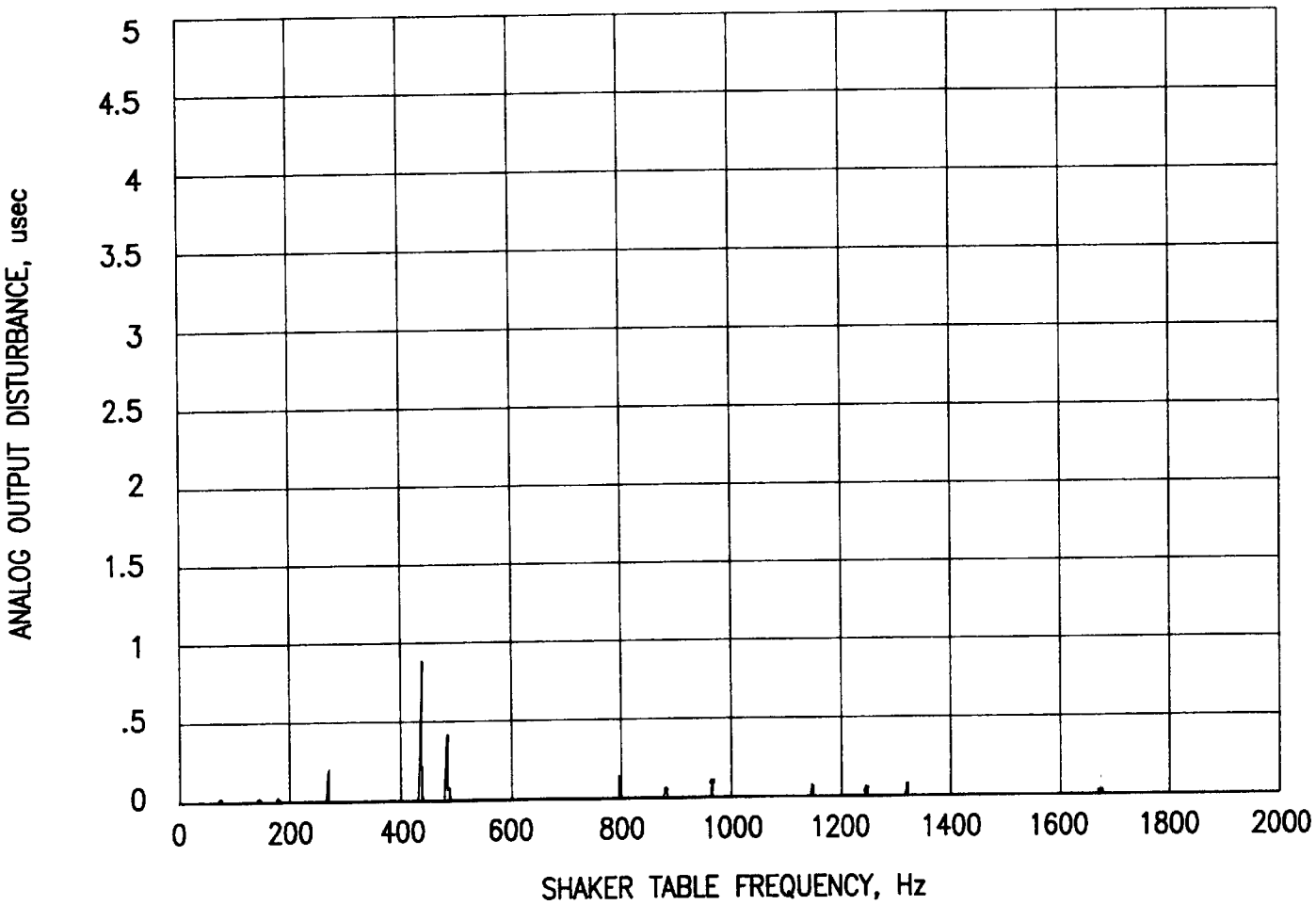
Figure 11L:
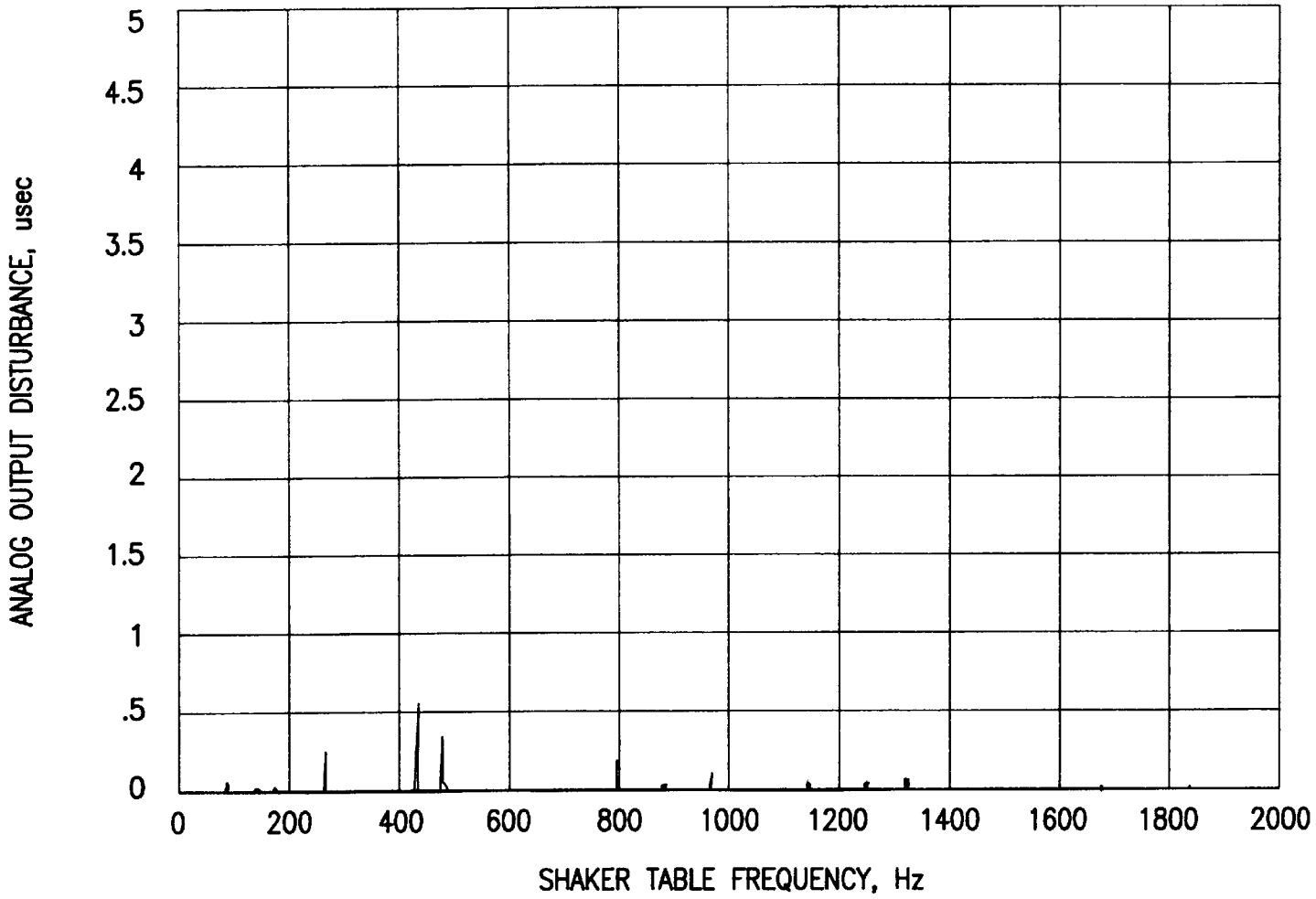

FIGS 10E, F and G are plots of shaker table test data obtained similarly to the data depicted in FIGS. 5A to 7I, but presented as plots of shaker table frequency (in Hertz) against analog output (i.e. mass flow rate) disturbance in seconds, whereas FIGS. 5A to 7I are reproductions of strip charts plotting shaker table frequency in Hertz against motion sensor readings per se. In addition, the data in FIGS. 10E, F and G were collected on the same meter assembly with half case attachment as that to which FIGS. 10A–D inclusive apply. For comparison purposes, similar plots for two different D25 flow conduit units, each without case attachment, are presented in FIGS. 11A–11L inclusive. In each instance, the x, y and z - axes are as defined above, the shaker table vertical scale frequency sweep is from 15 to 2000 Hertz, the remote frequency transmitter from which analog output data were obtained had a span of 5 grams per second and a calibration factor of 1. Other parameters of interest are summarized in Table 3:

TABLE 3

| FIG. | Sweep of the Vibration Table | Motion Axis | Unit |
|---|---|---|---|
| 10E | log | x | Embodiment of this invention |
| 10F | " | y | Embodiment of this invention |
| 10G | " | z | Embodiment of this invention |
| 11A | linear | x | Model D25 Unit 1 |

TABLE 3-continued

| FIG. | Sweep of the Vibration Table | Motion Axis | Unit |
|---|---|---|---|
| 11B | log | x | Model D25 Unit 1 |
| 11C | linear | y | Model D25 Unit 1 |
| 11D | log | y | Model D25 Unit 1 |
| 11E | linear | z | Model D25 Unit 1 |
| 11F | log | z | Model D25 Unit 1 |
| 11G | linear | x | Moded D25 Unit 2 |
| 11H | log | x | Moded D25 Unit 2 |
| 11I | linear | y | Moded D25 Unit 2 |
| 11J | log | y | Moded D25 Unit 2 |
| 11K | linear | y | Moded D25 Unit 2 |
| 11L | log | y | Moded D25 Unit 2 |

A linear sweep of the vibration table expends the same amount of time in moving through each 100 Hertz vibration interval so that, e.g. a sweep of 15 to 115 Hertz occurs in the same time interval as e.g. 1000 to 1100 Hertz. In log sweep, an amplified time interval is consumed at low frequencies, e.g., from 15 to 400 Hertz and a shortened (or speeded up) time interval is consumed at the higher frequency end. In both instances, the total sweep time is the same. As can be seen, log sweep clearly points out the frequencies at which external excitations have given rise to harmonic disturbances in current commercial Model D meters. FIGS. 10E, F and G show the meters of this invention to be markedly less susceptible to such influences than the D25 flow conduits.

Although the preferred embodiment is illustrated for a dual flow conduit mass flow meter, it is contemplated that the invention described herein can be embodied in a Coriolis mass flow meter having only one flow conduit, either in conjunction with a member such as leaf spring, or a dummy conduit, that forms a tuning fork with the flow conduit or under circumstances where the single flow conduit is of very small mass and is mounted to a base of relatively very large mass.

While the foregoing detailed discussion focuses, for exemplary purposes, upon one size and shape of flow tube, numerous changes and modifications in the actual implementation of the invention described herein will be readily apparent to those of ordinary skill in the art, and it is contemplated that such changes and modifications may be made without departing from the scope of the invention as defined by the following claims.

We claim:

1. A mass flow meter for flowable materials wherein mass flow rates for flowable materials are determined based on at least one measured effect of Coriolis forces, said flow meter comprising: a support means; at least one continuous flow conduit which is free of pressure sensitive joints or sections, each of said conduits being solidly mounted to said support means at inlet and outlet ends for said conduits; driver means for oscillating each of said conduits about bending axes adjacent each of said solid mountings; a pair of sensor means mounted on each of said conduits for monitoring motion of said conduits while flowable materials are flowing therethrough and said conduits being oscillated by said driver means about said bending axes, monitored motion including motion caused by Coriolis forces about twist axes for each of said conduits, said sensor means generating signals related to all motions of said conduits; and signal processing means to detect and convert said signals to mass flow rate values; in which the improvement comprises:

fixed mounting of each of said pair of sensor means on each of said conduits to monitor motions of said conduits including motions about said twist axes, where each sensor means is mounted between *and as close as possible to two proximate* nodes of a pair of vibration modes for said conduit, said pair of vibration modes being selected from a pairing of the first in phase bending mode, first out of phase bending mode, first out of phase twist mode, second out of phase twist mode, second out of phase bending mode, or third out of phase bending mode.

2. A mass flow meter according to claim 1 in which said continuous flow conduit has an essentially straight inlet leg and an essentially straight outlet leg which converge toward one another at said support and are interconnected opposite said support by the remainder of said continuous conduit.

3. A mass flow meter according to claim 2 in which said inlet and outlet legs are interconnected opposite said support by an essentially straight portion of said conduit which curves at either end to meet each of the essentially straight leg portions.

4. A mass flow meter according to either of claim 2 or claim 3 in which members of said sensor pairs are placed between nodes of the second out of phase twist mode and the second out of phase bending mode on the respective inlet and outlet sides of each flow conduit.

5. A flow meter according to claim 1 having at least two flow conduits clamped together by brace bars at points along the inlet and outlet legs which are spaced from the support, said points having been determined by modal analysis to be those points which provide optimum separation between the frequencies of the first in phase bending mode and the first out of phase bending mode so as to minimize effects of the first in phase bending mode on meter sensitivity.

6. A flow meter according to claim 5 in which said continuous flow conduit has an essentially straight inlet leg and an essentially straight outlet leg which converge toward one another at said support and are interconnected opposite said support by the remainder of said continuous conduit.

7. A flow meter according to claim 5 in which the race bars include nipple shaped mounting sleeve means.

8. A flow meter according to either of claim 2 or claim 3 having at least two flow conduits, wherein the support comprises a flangeless inlet and outlet plenum which further comprises two separated flow chambers, one for flow separation on the inlet side and one for flow recombination on the outlet side.

9. A flow meter according to claim 1 further comprising a pressure tight case of essentially the same geometric configuration as said flow conduit which encases all of said conduit, said sensor means and said driver, and is welded to said support.

10. A flow meter according to either of claim 2 or claim 3 further comprising a pressure tight case of essentially the same geometric configuration as said flow conduit which encases all of said conduit, said sensor means and said driver, and is welded to said support.

* * * * *